(12) United States Patent
Han et al.

(10) Patent No.: US 12,511,119 B2
(45) Date of Patent: Dec. 30, 2025

(54) DATA PROCESSING METHOD AND RELATED DEVICE

(71) Applicant: SHENZHEN YINWANG INTELLIGENT TECHNOLOGIES CO., LTD., Shenzhen (CN)

(72) Inventors: Lei Han, Hangzhou (CN); Xingwang Wu, Hangzhou (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 214 days.

(21) Appl. No.: 18/359,403

(22) Filed: Jul. 26, 2023

(65) Prior Publication Data

US 2024/0020111 A1    Jan. 18, 2024

Related U.S. Application Data

(63) Continuation of application No. PCT/CN2021/126628, filed on Oct. 27, 2021.

(30) Foreign Application Priority Data

Jan. 30, 2021   (CN) .......................... 202110131693.8

(51) Int. Cl.
G06F 8/658         (2018.01)
(52) U.S. Cl.
CPC .................... G06F 8/658 (2018.02)
(58) Field of Classification Search
CPC ..... G06F 8/658; G06F 11/1004; H04L 41/082
(Continued)

(56) References Cited

U.S. PATENT DOCUMENTS

| 11,221,840 B2* | 1/2022 | Hong ................ H04W 28/0231 |
| 2014/0282470 A1* | 9/2014 | Buga .......................... G06F 8/65 |
| | | 717/170 |

(Continued)

FOREIGN PATENT DOCUMENTS

| CN | 110231952 A | 9/2019 |
| CN | 111327454 A | 6/2020 |

(Continued)

OTHER PUBLICATIONS

Mbakoyiannis, Dimitris, Othon Tomoutzoglou, and George Kornaros. "Secure over-the-air firmware updating for automotive electronic control units." Proceedings of the 34th ACM/SIGAPP symposium on applied computing. 2019. pp. 174-181. (Year: 2019).*

(Continued)

*Primary Examiner* — Satish Rampuria
(74) *Attorney, Agent, or Firm* — Fish & Richardson P.C.

(57) ABSTRACT

Embodiments of this application disclose a data processing method and a related device. One example method includes: A control device receives a first data transmission request sent by a diagnostic device, where the first data transmission request is used to request the control device to receive an upgrade file, the first data transmission request carries a first memory address corresponding to the upgrade file, and the upgrade file is used to upgrade the control device. The control device obtains a first file path corresponding to the first memory address, receives the upgrade file sent by the diagnostic device, and stores the upgrade file into a file to which the first file path points.

20 Claims, 10 Drawing Sheets

(58) Field of Classification Search
USPC .................................................. 717/120–178
See application file for complete search history.

(56) References Cited

U.S. PATENT DOCUMENTS

| | | | | |
|---|---|---|---|---|
| 2016/0325754 | A1* | 11/2016 | Stahulak | B60W 50/085 |
| 2016/0371076 | A1* | 12/2016 | Moeller | G06F 8/654 |
| 2019/0278583 | A1* | 9/2019 | Nie | G06F 8/65 |
| 2021/0157573 | A1* | 5/2021 | Abe | G06F 3/14 |
| 2021/0157902 | A1* | 5/2021 | Sakurai | B60R 16/0231 |
| 2022/0179644 | A1* | 6/2022 | Harata | G06F 8/65 |

FOREIGN PATENT DOCUMENTS

| | | |
|---|---|---|
| CN | 111459518 A | 7/2020 |
| CN | 112073500 A | 12/2020 |
| JP | 2016167295 A | 9/2016 |
| JP | 2016170740 A | 9/2016 |
| JP | 2017146655 A | 8/2017 |
| JP | 2019101917 A | 6/2019 |
| JP | 2019204152 A | 11/2019 |
| JP | 2020107237 A | 7/2020 |
| WO | 2020032046 A1 | 2/2020 |
| WO | 2020080321 A1 | 4/2020 |

OTHER PUBLICATIONS

Zhang, Ji, Yu Lv, and Zhi Liao. "Research on automotive ECU remote update and it's security." Journal of Physics: Conference Series. vol. 1074. No. 1. IOP Publishing, 2018. pp. 1-9. (Year: 2018).*

Daimi, Kevin, Mustafa Saed, and Muhammad Rizwan Scott Bone. "Securing vehicle ECUs update over the air." AICT 2016 (2016): pp. 45-50. (Year: 2016).*

Hicks, Michael, and Scott Nettles. "Dynamic software updating." ACM Transactions on Programming Languages and Systems (TOPLAS) 27.6 (2005): pp. 1049-1096. (Year: 2005).*

Pennington, Adam G., et al. "Storage-based intrusion detection." ACM Transactions on Information and System Security (TISSEC) 13.4 (2010): pp. 1-27. (Year: 2010).*

Cao, Yang, et al. "Secure method for software upgrades for implantable medical devices." Tsinghua Science and Technology 15.5 (2010): pp. 517-525. (Year: 2010).*

Wikipedia.org [online], "Unified Diagnostic Services—Wikipedia," Nov. 18, 2020, retrieved on May 15, 2024, retrieved from URL<https://en.wikipedia.org/w/index.php?title=Unified_Diagnostic_services&oldid=989358908>, 6 pages.

Extended European Search Report in European Appln No. 21922407.8, dated May 28, 2024, 9 pages.

Shuai et al., "Development of bootloader upper computer based on UDS on can," Automobile Applied Technology, No. 15, Aug. 14, 2020, 3 pages (with English abstract).

Li et al., "Design of Brushing Software for New Energy Vehicle Controller Based on LabVIEW," Software Engineering, vol. 23, No. 2, Feb. 5, 2020, 4 pages (with English abstract).

International Search Report and Written Opinion in International Appln. No. PCT/CN2021/126628, mailed on Feb. 9, 2022, 16 pages (with English translation).

Office Action in Japanese Appln. No. 2023-542916, mailed on Aug. 27, 2024, 4 pages (with English translation).

Office Action in Indian Appln. No. 202327046614, mailed on May 2, 2025, 7 pages (with English translation).

* cited by examiner

DATA PROCESSING METHOD AND RELATED DEVICE

CROSS-REFERENCE TO RELATED APPLICATIONS

This application is a continuation of International Patent Application No. PCT/CN2021/126628, filed on Oct. 27, 2021, which claims priority to Chinese Patent Application No. 202110131693.8, filed on Jan. 30, 2021. The disclosures of the aforementioned applications are hereby incorporated by reference in their entireties.

TECHNICAL FIELD

This application relates to the vehicle field, and in particular, to a data processing method and a related device.

BACKGROUND

In the field of vehicle electronics, an electronic control unit (ECU) is a "computer" applied to a vehicle to implement functions such as vehicle status monitoring and signal processing, and is a controller of the vehicle. Currently, most vehicles perform an upgrade procedure based on the unified diagnostic services (UDS) protocol to upgrade an ECU in a vehicle. Specifically, in a programming step in the UDS protocol, a diagnostic device sends a memory address of an upgrade file and a file size of the upgrade file to the ECU, to notify the ECU to store, in a location indicated by the memory address, the upgrade file downloaded from the diagnostic device. Because a conventional ECU is based on a flash memory, a file download process is a flash programming process, and that download is completed means that programming is completed. The file takes effect immediately after the ECU is reset.

With development of a chip technology, an internet of things technology, and a communication technology, more vehicles are equipped with intelligent ECUs with operating systems, to implement functions such as self-driving and audio and video entertainment. However, upgrade of the intelligent ECU cannot be implemented by programming the flash. Consequently, the upgrade procedure based on the UDS protocol cannot be adapted.

SUMMARY

Embodiments of this application provide a data processing method and a related device. After a memory address sent by a diagnostic device is received, a file path corresponding to the memory address is obtained, and a received upgrade file is stored on the file path, that is, the upgrade file can be downloaded by the diagnostic device under constraint of the UDS protocol, to implement an upgrade operation on a control device.

To resolve the foregoing technical problem, embodiments of this application provide the following technical solutions.

According to a first aspect, an embodiment of this application provides a data processing method, and the method may be applied to the vehicle field. The method includes: In a programming step, a control device receives a first data transmission request sent by a diagnostic device. Under constraint of the UDS protocol, a process in which the diagnostic device is used to upgrade the control device may be divided into a pre-programming step, a programming step, and a post-programming step. The first data transmission request is used to request the control device to receive an upgrade file, the first data transmission request carries a first memory address corresponding to the upgrade file and a file size of the upgrade file, and the upgrade file is used to upgrade the control device. Further, the first data transmission request is a determining instruction, and a diagnostic service identifier SID of the first data transmission request may be 0x36. The control device obtains a first file path corresponding to the first memory address, creates a first file based on an indication of the first file path, and sends a positive response corresponding to the first data transmission request to the diagnostic device. The control device receives the upgrade file sent by the diagnostic device, and stores the upgrade file into the first file to which the first file path points. It should be noted that a file format of the first file created in this embodiment of this application may be a file format that does not carry address information, that is, the file format may be zip or tar.gz, or another file format that does not carry the address information, or may be a file format that carries the address information, such as s19 or hex.

In this implementation, after receiving the memory address sent by the diagnostic device, the control device first obtains the file path corresponding to the memory address, and then stores the upgrade file received from the diagnostic device on the file path. Because the control device can determine a storage location based on the file path, the control device can store the upgrade file sent by the diagnostic device into the file indicated by the file path, to complete an operation of storing the upgrade file. Further, the control device can obtain the upgrade file through the diagnostic device under constraint of the UDS protocol.

In a possible implementation of the first aspect, that the control device obtains the first file path corresponding to the first memory address includes: The control device obtains a pre-stored target mapping relationship, and obtains, based on the target mapping relationship, the first file path corresponding to the first memory address, where the target mapping relationship indicates a one-to-one correspondence between at least one memory address and at least one file path. Further, because there are a large quantity of storage units in a memory of a vehicle, to locate each storage unit, a memory address needs to be assigned to each storage unit, and the memory address indicates a number of a storage unit in the memory. The target mapping relationship may be preconfigured in the vehicle when the control device is delivered from a factory, or the target mapping relationship may be updated in an upgrade process of the control device.

In this implementation, the control device pre-stores the target mapping relationship, and the target mapping relationship indicates the one-to-one correspondence between the at least one memory address and the at least one file path, so that the control device can quickly obtain, based on the pre-stored target mapping relationship, the first file path corresponding to the first memory address. This helps increase a speed of obtaining the first file path.

In a possible implementation of the first aspect, before the control device receives the first data transmission request sent by the diagnostic device, the method further includes: In the programming step, the control device receives a second data transmission request sent by the diagnostic device, the second data transmission request is used to request the control device to receive a flash drive program, and the second data transmission request carries a second memory address corresponding to the flash drive program and a size of the flash drive program. The control device obtains a pre-stored target mapping relationship (that is, a correspondence between a memory address and a file path), obtains a second file path corresponding to the second memory address based on the target mapping relationship, creates a second file based on an indication of the second file path, and sends a positive response corresponding to the second data transmission request to the diagnostic device, where the first file path and the second file path are different file paths. The control device receives the flash drive program sent by the diagnostic device, and stores the flash drive program into the second file to which the second file path points.

In this implementation, in the programming step, after receiving the transmission request of the flash drive program, the control device can obtain the second file path corresponding to the second memory address (that is, a start storage address of the flash drive program in the memory), and store the flash drive program into the file to which the second file path points. That is, under constraint of the UDS protocol, the control device can also store the flash drive program in the memory, to ensure that a processing manner of the control device meets a requirement of the UDS protocol, so as to reduce termination in the upgrade process of the control device. This helps improve a success rate of upgrading the control device by using the diagnostic device.

In a possible implementation of the first aspect, after the control device stores the upgrade file into the file to which the first file path points, the method further includes: When the control device is in a programming session, the control device receives a reset request sent by the diagnostic device, and sends a positive response corresponding to the reset request to the diagnostic device, where the reset request may specifically indicate the control device to perform hard reset, that is, indicates the control device to perform a restart operation. The programming session, an extended diagnostic session, and a default session are three different session modes of the control device. A sub-service code of the programming session is 02. The control device can be upgraded only in the programming session. The control device determines, in response to the received reset request, whether a programming dependency check operation is performed by the control device, triggers, when determining that the programming dependency check operation is performed by the control device, performing the upgrade operation on the control device based on the upgrade file, and performs a reset operation on the control device. The programming dependency check operation aims to check validity and compatibility of the downloaded upgrade file. In the UDS protocol, the programming dependency is translated into validate application in English, and a meaning of programming dependency may be understood with reference to the UDS protocol.

In this implementation, in the UDS protocol, after a non-control device completes download of the upgrade file, it is considered that the upgrade operation on the control device is completed. However, for the control device, only downloading the upgrade file locally cannot complete the upgrade operation on the control device. In this embodiment of this application, it is selected that after the control device receives the reset request, triggering of the upgrade operation is automatically completed, to ensure that the upgrade process of the control device is fully automated.

In a possible implementation of the first aspect, that the control device determines whether the programming dependency check operation is performed by the control device includes: The control device determines, based on a target record, whether the programming dependency check operation is performed by the control device, where the target record indicates whether the programming dependency check operation is performed by the control device. The target record may be specifically represented as a flag bit that is in the control device and that records whether the programming dependency check is performed. When a value of the flag bit is a first value, it indicates that the programming dependency check operation is performed by the control device; or when a value of the flag bit is a second value, it indicates that the programming dependency check operation is performed by the control device, where the first value and the second value are different values. If the target record indicates that the programming dependency check operation is performed by the control device, the control device updates the target record again after determining whether the programming dependency check operation is performed by the control device, and an updated target record indicates that the programming dependency check operation is not performed by the control device.

In a possible implementation of the first aspect, that the control device performs the upgrade operation on the control device based on the upgrade file includes: The control device performs a decompression operation on the downloaded upgrade file, to obtain a plurality of upgrade sub-files, configuration information, and a system version number. The configuration information indicates an installation manner of each upgrade sub-file in the upgrade file. The control device installs the plurality of upgrade sub-files in the upgrade file in corresponding manners based on indications of the configuration information, to complete the upgrade operation on the control device.

In a possible implementation of the first aspect, the method further includes: In the programming step, the control device receives a third diagnostic instruction sent by the diagnostic device, and the third diagnostic instruction instructs the control device to perform an erase operation on data in first storage space. The first storage space is a storage location of the upgrade file that the diagnostic device wants to send to the control device, and the third diagnostic instruction carries the first memory address and a size of space that the diagnostic device needs the control device to erase, that is, a start point of the first storage space is the first memory address, and a size of the first storage space is the size of the space that the diagnostic device needs the control device to erase (that is, the size of the upgrade file of the control device). In response to the received third diagnostic instruction, the control device obtains, based on the target mapping relationship, the first file path corresponding to the first memory address, and performs a deletion operation on a third file to which the first file path points. It should be noted that the third file and the first file are different files, the third file is a file created by the control device in a previous upgrade process, and when the deletion operation is performed on the third file, the control device has not created the first file.

In a possible implementation of the first aspect, the method further includes: In the programming step, the control device receives a third diagnostic instruction sent by the diagnostic device, and the third diagnostic instruction instructs the control device to perform an erase operation on data in first storage space. The control device directly sends, in response to the received third diagnostic instruction, a positive response corresponding to the third diagnostic instruction to the diagnostic device, and the positive response corresponding to the third diagnostic instruction indicates that the erase operation on the data in the first storage space is completed by the control device.

In a possible implementation of the first aspect, the method further includes: receiving the reset request when the control device is in the programming session; and in response to the received reset request, triggering only the reset operation of the control device when the programming dependency check operation is not performed by the control device.

In this implementation, when the control device is in the programming session, the control device may receive the reset request not only in an upgrade program, but also in another program. Therefore, the control device determines whether the programming dependency check operation is performed, to determine whether the control device is in an upgrade procedure. When it is determined that the control device is not in the upgrade procedure, the control device performs only the reset operation and does not perform the upgrade program, to ensure that the control device performs the upgrade operation only by using the upgrade file during the upgrade process, and avoid incorrect triggering of the upgrade operation.

In a possible implementation of the first aspect, after the control device triggers performing the upgrade operation on the control device based on the upgrade file, the method further includes: when it is determined that the upgrade operation fails, setting the system version number of the control device to an invalid value, where the invalid value indicates that the upgrade operation fails; and when it is determined that the upgrade operation succeeds to be performed, setting the system version number of the control device to a system version number (that is, a valid system version number) carried in the upgrade file.

In this implementation, in the UDS protocol, downloading the upgrade file to the ECU is considered as completing the upgrade operation of the ECU. Therefore, the diagnostic device controls the ECU to perform the programming dependency check operation. If the programming dependency check operation is passed, the diagnostic device determines that upgrade of the ECU succeeds; or if the programming dependency check operation is not passed, the diagnostic device determines that upgrade of the ECU fails. In addition, in the UDS protocol, the diagnostic device determines, by determining whether the programming dependency check operation is passed, whether the upgrade of the ECU succeeds. Therefore, in a current non-intelligent ECU, according to the current UDS protocol, an upper computer does not check, based on the system version number, whether the upgrade succeeds. In this solution, after determining that the upgrade operation fails, the intelligent ECU sets the system version number of the intelligent ECU to the invalid value, so that the diagnostic device can check in time whether the upgrade of the intelligent ECU succeeds, to ensure the upgrade of the intelligent ECU really succeeds, so as to ensure the safety of a vehicle running process.

According to a second aspect, an embodiment of this application provides a data processing method, and the method may be applied to the vehicle field. The method includes: In a programming step, a diagnostic device sends a first data transmission request to a control device, the first data transmission request is used to request the control device to receive an upgrade file, the first data transmission request carries a first memory address, the first memory address corresponds to a first file path, and the upgrade file is used to upgrade the control device; and the diagnostic device receives a first positive response sent by the control device, and sends the upgrade file to the control device based on the first positive response, and the upgrade file is stored into a first file to which the first file path points.

In a possible implementation of the second aspect, after the diagnostic device sends the upgrade file to the control device, the method further includes: In a post-programming step, the diagnostic device sends a reset request to the control device, where the reset request indicates the control device to trigger, when a programming dependency check operation is performed, an upgrade operation on the control device based on the upgrade file, and a reset operation.

In a possible implementation of the second aspect, the method further includes: The diagnostic device sends a version number query request to the control device, and receives the system version number sent by the control device, where when the system version number is an invalid value, it indicates that upgrade of the control device fails.

In the second aspect of this embodiment of this application, the diagnostic device may further perform the steps performed by the diagnostic device in the possible implementations of the first aspect. For specific implementation steps of the second aspect and the possible implementations of the second aspect of this embodiment of this application, and beneficial effects brought by each possible implementation, refer to descriptions in the possible implementations of the first aspect. Details are not described herein again.

According to a third aspect, an embodiment of this application provides a control device, and the control device may be used in the vehicle field. The control device includes: a receiving module, configured to: in a programming step, receive a first data transmission request sent by a diagnostic device, where the first data transmission request is used to request the control device to receive an upgrade file, the first data transmission request carries a first memory address corresponding to the upgrade file, and the upgrade file is used to upgrade the control device; an obtaining module, configured to obtain a first file path corresponding to the first memory address; and a storage module, configured to: receive the upgrade file sent by the diagnostic device, and store the upgrade file into a first file to which the first file path points.

In the third aspect of this embodiment of this application, the control device may further perform the steps performed by the control device in the possible implementations of the first aspect. For specific implementation steps of the third aspect and the possible implementations of the third aspect of this embodiment of this application, and beneficial effects brought by each possible implementation, refer to descriptions in the possible implementations of the first aspect. Details are not described herein again.

According to a fourth aspect, an embodiment of this application provides a diagnostic device, and the diagnostic device may be used in the vehicle field. The diagnostic device includes: a sending module, configured to send a first data transmission request to a control device in a programming step, where the first data transmission request is used to request the control device to receive an upgrade file, the first data transmission request carries a first memory address corresponding to the upgrade file, the first memory address corresponds to a first file path, and the upgrade file is used to upgrade the control device; and a receiving module, configured to receive a first positive response sent by the control device, where the sending module is further configured to send the upgrade file to the control device based on the first positive response, and the upgrade file is stored into a file to which the first file path points.

In the fourth aspect of this embodiment of this application, the diagnostic device may further perform the steps performed by the diagnostic device in the possible implementations of the second aspect. For specific implementation steps of the fourth aspect and the possible implementations of the fourth aspect of this embodiment of this application, and beneficial effects brought by each possible implementation, refer to descriptions in the possible implementations of the second aspect. Details are not described herein again.

According to a fifth aspect, an embodiment of this application provides an electronic device. The electronic device may include a processor, the processor is coupled to a memory, and the memory stores program instructions. When the program instructions stored in the memory are executed by the processor, the data processing method in the first aspect or the second aspect is implemented.

According to a sixth aspect, an embodiment of this application provides a computer-readable storage medium. The computer-readable storage medium stores a computer program. When the computer program is run on a computer, the computer is enabled to perform the data processing method in the first aspect or the second aspect.

According to a seventh aspect, an embodiment of this application provides a circuit system. The circuit system includes a processing circuit, and the processing circuit is configured to perform the data processing method in the first aspect or the second aspect.

According to an eighth aspect, an embodiment of this application provides a computer program. When the computer program is run on a computer, the computer is enabled to perform the data processing method in the first aspect or the second aspect.

According to a ninth aspect, an embodiment of this application provides a chip system. The chip system includes a processor, configured to implement functions in the foregoing aspects, for example, sending or processing data and/or information in the foregoing method. In a possible design, the chip system further includes a memory. The memory is configured to store program instructions and data that are necessary for a server or a communication device. The chip system may include a chip, or may include a chip and another discrete component.

According to a tenth aspect, an embodiment of this application provides a vehicle. One or more control devices are configured in the vehicle, and the control device is configured to perform the steps performed by the control device in the data processing method in the first aspect or the second aspect.

According to an eleventh aspect, an embodiment of this application provides a data processing system. The data processing system includes a control device and a diagnostic device. The control device is configured to perform the steps performed by the control device in the data processing method in the first aspect or the second aspect. The diagnostic device is configured to perform the steps performed by the diagnostic device in the data processing method in the first aspect or the second aspect.

DESCRIPTION OF EMBODIMENTS

The following describes embodiments of this application with reference to accompanying drawings. A person of ordinary skill in the art may learn that, with development of technologies and emergence of new scenarios, technical solutions provided in embodiments of this application are also applicable to a similar technical problem.

In the specification, claims, and accompanying drawings of this application, terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, terms "include", "have", and any other variants thereof mean to cover the non-exclusive inclusion, so that a process, method, system, product, or device that includes a series of units is not necessarily limited to those units, but may include other units not expressly listed or inherent to such a process, method, product, or device.

In embodiments of this application, a control device is a control unit of a vehicle, or a data center, and may be a controller of a component of the vehicle, or may be a vehicle controller, for example, may be an electronic control unit (ECU), a vehicle control unit (VCU), a domain control unit (DCU), or a mobile data center (MDC). These control devices have operating systems and can manage memory, files, and the like. To distinguish from a conventional flash-based ECU and facilitate description, in embodiments of this application, the control device may be sometimes referred to as an intelligent control device, an intelligent ECU, or the like.

Further, an operating system is integrated into the intelligent ECU. A difference between the intelligent ECU and a non-intelligent ECU (may also be referred to as a "conventional flash-based ECU", a "conventional ECU", or the like) lies in that: In respect of software, a function of the non-intelligent ECU is simple, and the non-intelligent ECU executes a simple task by running a simple system; and the intelligent ECU has a complex operating system and a strong parallel processing capability, and can execute tasks such as audio and video entertainment, assisted driving, and self-driving. In respect of hardware, the non-intelligent ECU includes a single micro controller unit (MCU). A central processing unit (CPU) has a limited processing capability and is configured with limited storage space. The intelligent ECU has a powerful CPU and more storage space, or has a complex heterogeneous computer system consisting of a plurality of processors.

Figure 1A:
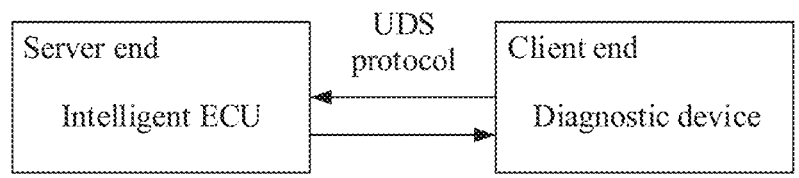
FIG. 1a is a diagram of a system architecture of a data processing system according to an embodiment of this application.

A UDS protocol is a general vehicle diagnostic protocol defined based on the ISO 15765 standard and the ISO 14229 standard. The UDS protocol defines a process in which a diagnostic device serves as a client end to upgrade (may also be referred to as "update") a control device at a server end, for example, an ECU in a vehicle. The upgrade process may be divided into a pre-programming step, a programming step, and a post-programming step. The diagnostic device may also be referred to as an upper computer in some scenarios. Further, FIG. 1a is a diagram of a system architecture of a data processing system according to an embodiment of this application. In FIG. 1a, an intelligent ECU at a server end and a diagnostic device at a client end are included. The process of upgrading the intelligent ECU by using the diagnostic device under constraint of the UDS protocol is also a process in which under constraint of the UDS protocol, the diagnostic device sends a diagnostic instruction to the intelligent ECU, to control the intelligent ECU to upgrade.

Specifically, in the programming step, the diagnostic device sends a data transmission request to the intelligent ECU in the vehicle, and the data transmission request is used to request to start data transmission between the diagnostic device and the control device. The data transmission request carries a memory address corresponding to an upgrade file and a file size of the upgrade file. If the intelligent ECU (for descriptions of the "intelligent ECU", refer to the following) is configured in the vehicle, because the intelligent ECU cannot adapt to an upgrade procedure based on the UDS protocol, the received upgrade file cannot be saved, that is, the diagnostic device cannot send the upgrade file to the intelligent ECU, so that an upgrade operation on the intelligent ECU cannot be completed.

Figure 1B:
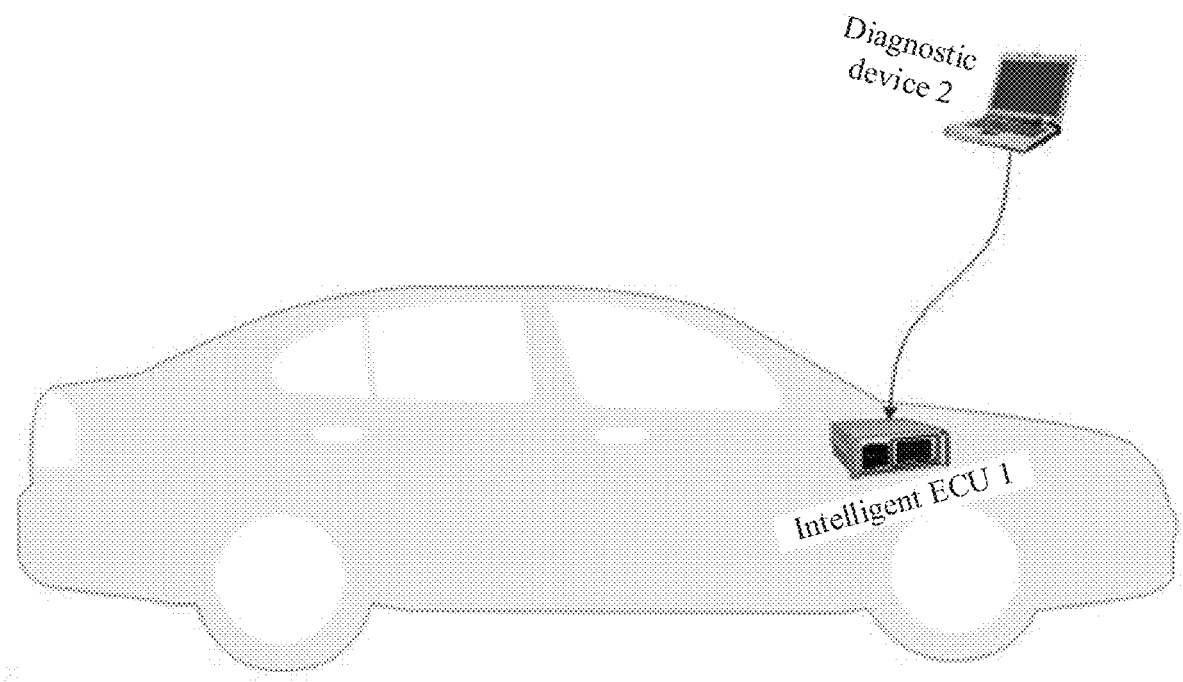
FIG. 1B is a diagram of another system architecture of a data processing system according to an embodiment of this application.

To resolve the problem, an embodiment of this application provides a data processing method. To understand this solution more intuitively, a data processing system provided in this embodiment of this application is first described. FIG. 1B is a diagram of a system architecture of a data processing system according to an embodiment of this application. As shown in FIG. 1B, the data processing system includes one or more intelligent ECUs 1 and a diagnostic device 2. The one or more intelligent ECUs 1 may be configured in a vehicle, and the diagnostic device 2 is connected to the intelligent ECU 1 through a wired network.

Specifically, under constraint of the UDS protocol, in a programming step, before sending an upgrade file to the intelligent ECU 1, the diagnostic device 2 first sends a data transmission request to the intelligent ECU 1, and the data transmission request carries a memory address corresponding to the upgrade file and a file size of the upgrade file. After receiving the data transmission request, the intelligent ECU 1 obtains a file path corresponding to the memory address. Because the intelligent ECU 1 can determine a storage location based on the file path, the intelligent ECU 1 can store the upgrade file sent by the diagnostic device 2 into a file to which the file path points, that is, an upgrade operation on the intelligent ECU 1 can be implemented by using the diagnostic device 2 under constraint of the UDS protocol.

The diagnostic device may also be referred to as a tester. The vehicle may be a device in which the intelligent ECU is disposed, such as a car, a truck, a motorcycle, a bus, a boat, an airplane, a helicopter, a lawn mower, a recreational vehicle, a playground vehicle, a construction device, a trolley, a golf cart, a train, or a handcart. This is not specifically limited in this embodiment of this application.

Specifically, in one case, a plurality of intelligent ECUs 1 are configured in the vehicle, and different intelligent ECUs 1 in the plurality of intelligent ECUs 1 are responsible for different functions. For example, an intelligent ECU 1 may also be referred to as an engine management system (EMS), and is responsible for controlling functions such as fuel injection, ignition, and torque allocation of an engine. In another example, an intelligent ECU 1 may alternatively be referred to as an automatic transmission control unit (TCU), and is mainly responsible for using different gear policies based on a driving status of the vehicle. In still another example, for example, an intelligent ECU 1 may alternatively be referred to as a body control module (BCM), and is mainly responsible for controlling body appliances such as a lamp, a wiper, a door lock, an electric window, a skylight, and an electric rearview mirror. In still yet another example, an intelligent ECU 1 may also be an operating system configured to control stability of a vehicle body, or an intelligent ECU 1 is represented as a battery management system (BMS), or an intelligent ECU 1 is configured to coordinate work of components such as an engine, a drive motor, a converter, and a power battery, to improve economy, power, and security of the vehicle, reduce emission pollution, and the like. Specific functions of the intelligent ECU 1 are not exhaustively described herein. It should be noted that, if the plurality of intelligent ECUs 1 are configured in the vehicle, the diagnostic device 2 may upgrade the plurality of intelligent ECUs 1 one by one.

In another case, one intelligent ECU 1 may be configured in the vehicle. The intelligent ECU 1 may be a general control system of the entire vehicle. Functions such as transmitter management, battery management, vehicle body control, and transmission control unit control are integrated in the intelligent ECU 1. It should be noted that, although FIG. 1B shows only one intelligent ECU 1, a quantity of intelligent ECUs 1 actually included in the vehicle needs to be determined based on an actual configuration of the vehicle.

Figure 2:
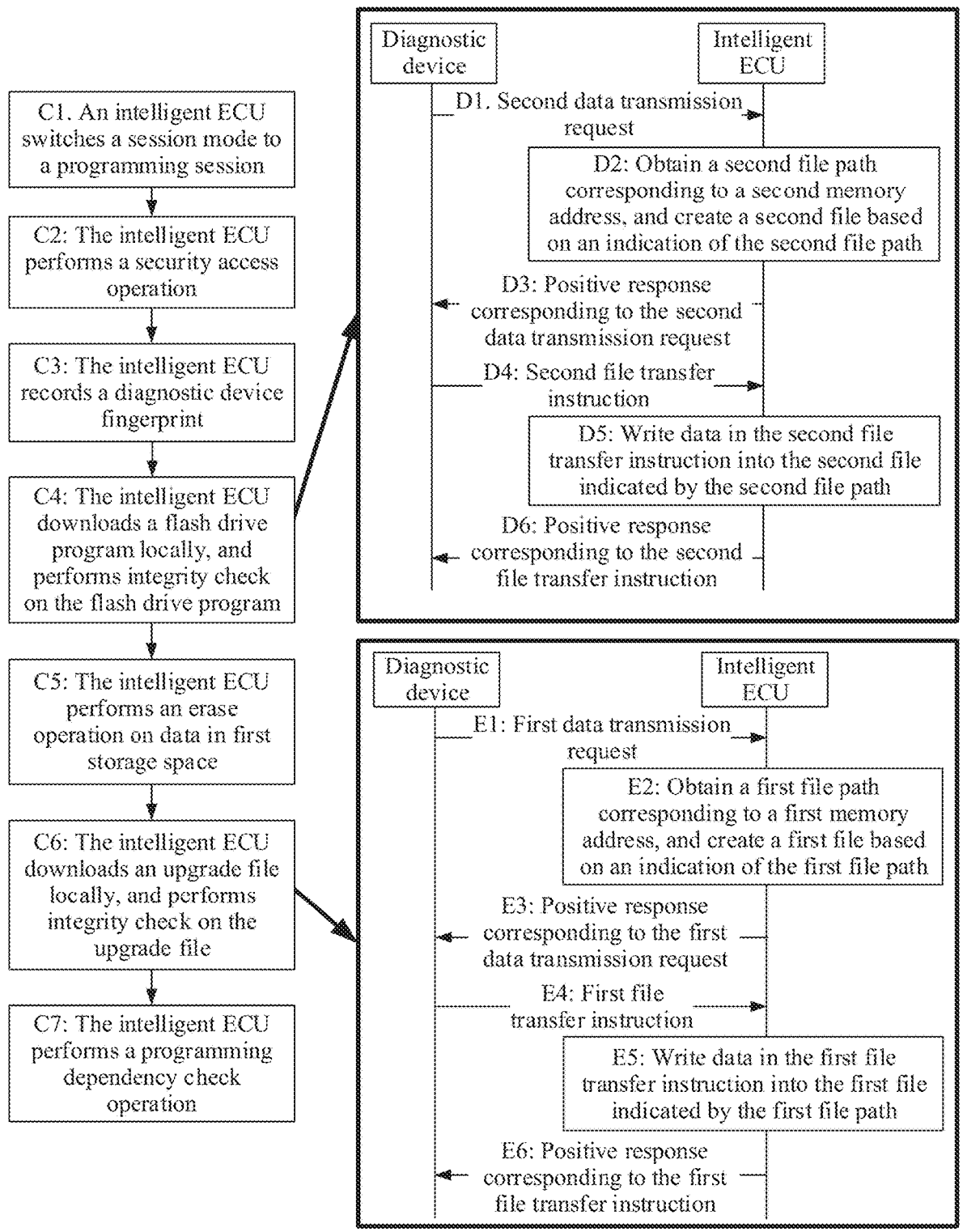
FIG. 2 is a schematic flowchart of a data processing method according to an embodiment of this application.

Before the data processing method provided in embodiments of this application is described in detail, core improvement points in embodiments of this application are first described. FIG. 2 is a schematic flowchart of a data processing method according to an embodiment of this application. In a left sub-schematic diagram of FIG. 2, C1: An intelligent ECU switches a session mode to a programming session. C2: The intelligent ECU performs a security access operation. C3: The intelligent ECU records a diagnostic device fingerprint. C4: The intelligent ECU downloads a flash drive program locally, and performs integrity check on the flash drive program. Specifically, as shown in an upper right sub-schematic diagram of FIG. 2, C4 includes: D1: The intelligent ECU receives a second data transmission request sent by a diagnostic device, where the second data transmission request carries a second memory address. D2: The intelligent ECU obtains a second file path corresponding to the second memory address, and creates a second file based on an indication of the second file path. D3: The intelligent ECU sends a positive response corresponding to the second data transmission request to the diagnostic device. D4: The intelligent ECU receives a second file transfer instruction sent by the diagnostic device, where the second file transfer instruction carries the flash drive program. D5: The intelligent ECU writes data in the second file transfer instruction into the second file indicated by the second file path. D6: The intelligent ECU sends a positive response corresponding to the second file transfer instruction to the diagnostic device. C5: The intelligent ECU performs an erase operation on data in first storage space. C6: The intelligent ECU downloads an upgrade file locally, and performs integrity check on the upgrade file. Specifically, as shown in a lower right sub-schematic diagram of FIG. 2, C6 includes: E1: The intelligent ECU receives a first data transmission request sent by the diagnostic device, where the first data transmission request carries a first memory address. E2: The intelligent ECU obtains a first file path corresponding to the first memory address, and creates a first file based on an indication of the first file path. E3: The intelligent ECU sends a positive response corresponding to the first data transmission request to the diagnostic device. E4: The intelligent ECU receives a first file transfer instruction sent by the diagnostic device, where the first file transfer instruction carries the upgrade file. E5: The intelligent ECU writes data in the first file transfer instruction into the first file indicated by the first file path. E6: The intelligent ECU sends a positive response corresponding to the first file transfer instruction to the diagnostic device. C7: The intelligent ECU performs a programming dependency check operation. It can be learned from FIG. 2 that main improvement points in embodiments of this application lie in two steps of downloading the upgrade file and the flash drive program by the intelligent ECU. It should be noted that a core problem that needs to be resolved in embodiments of this application is how to send the upgrade file to the intelligent ECU by using the diagnostic device under constraint of the UDS protocol, that is, core steps in this embodiment of this application are E1 to E6. An example in FIG. 2 is merely for ease of understanding of this solution, and is not intended to limit this solution.

The process of upgrading the ECU by using the diagnostic device defined in the UDS protocol is divided into a pre-programming step, a programming step, and a post-programming step. However, the data processing method provided in embodiments of this application is changed mainly in the programming step and the post-programming step. In consideration of solution integrity, the following first sequentially describes specific implementation procedures of the programming step and the post-programming step in the data processing method provided in embodiments of this application.

1. Programming Step

Figure 3:
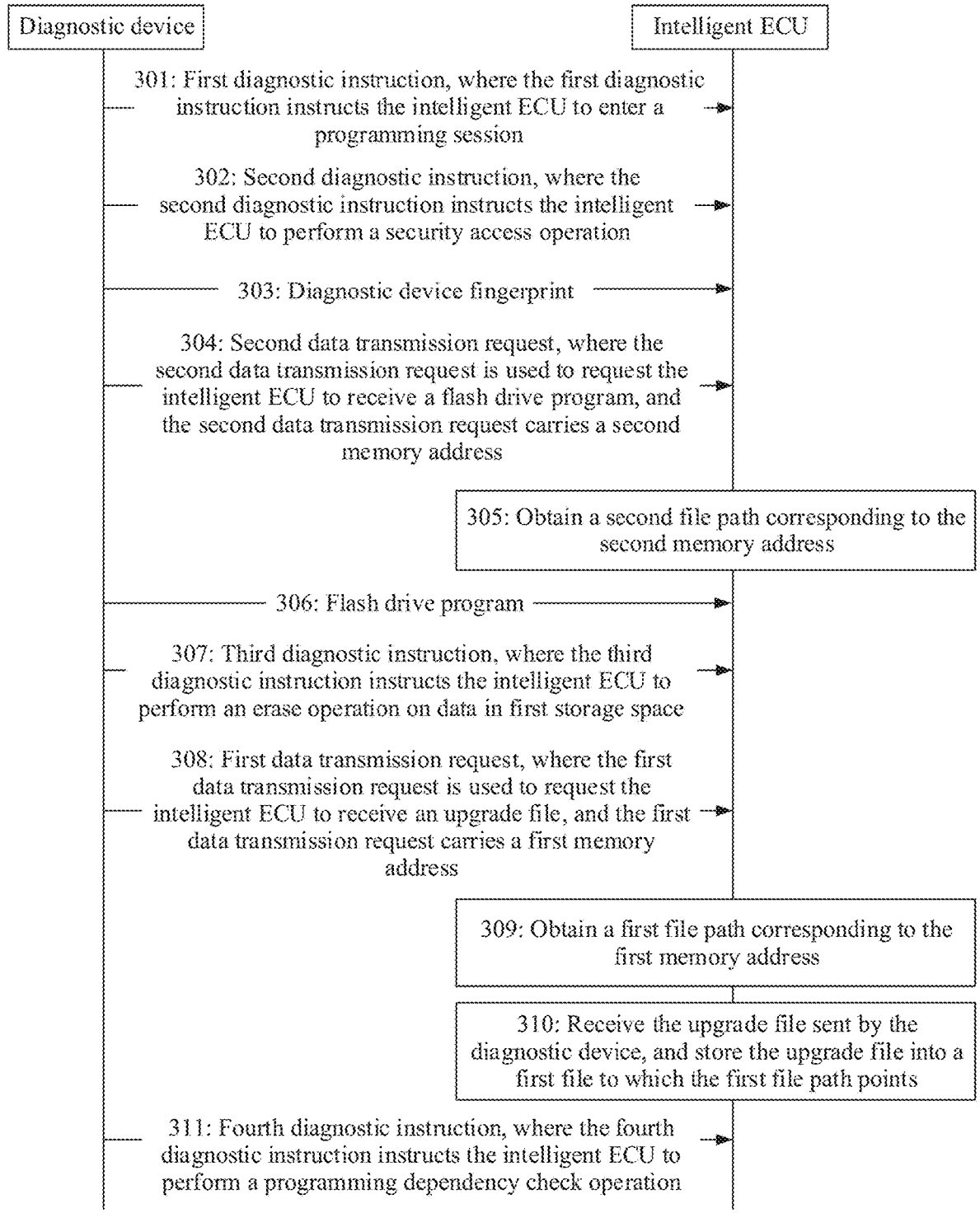
FIG. 3 is another schematic flowchart of a data processing method according to an embodiment of this application.

In this embodiment of this application, refer to FIG. 3. FIG. 3 is a schematic flowchart of a data processing method according to an embodiment of this application. As shown in FIG. 3, in the programming step, step 308 to step 310 are performed, so that an upgrade file can be sent to an intelligent ECU by using a diagnostic device under constraint of the UDS protocol. For ease of understanding of this solution, the following describes the entire programming step in detail by performing step 301 to step 311. The data processing method provided in this embodiment of this application may include the following steps.

301: The diagnostic device sends a first diagnostic instruction to the intelligent ECU, where the first diagnostic instruction instructs the intelligent ECU to enter a programming session.

In this embodiment of this application, after determining that the intelligent ECU completes an operation of the pre-programming step, the diagnostic device may send the first diagnostic instruction to the intelligent ECU. The first diagnostic instruction instructs the intelligent ECU to switch a current session mode to the programming session. Further, a name of the first diagnostic instruction in the UDS protocol may be a diagnostic session control instruction.

In response to the received first diagnostic instruction, the intelligent ECU first learns whether the intelligent ECU is currently in the programming session. If the intelligent ECU is in the programming session, the intelligent ECU directly sends a positive response to the diagnostic device, where the positive response is used to notify the diagnostic device that the intelligent ECU has entered the programming session. If the intelligent ECU is not in the programming session, the intelligent ECU performs a session mode switching operation, to switch the current session mode of the intelligent ECU to the programming session. If the intelligent ECU successfully switches to the programming session, the intelligent ECU sends a positive response to the diagnostic device. If the intelligent ECU fails to switch to the programming session, the intelligent ECU sends a negative response to the diagnostic device, where the negative response is used to notify the diagnostic device that the intelligent ECU fails to enter the programming session.

If the diagnostic device receives the positive response sent by the intelligent ECU, step 302 is performed. If the diagnostic device receives the negative response sent by the intelligent ECU, program upgrade for the intelligent ECU is terminated. Optionally, the diagnostic device may further output prompt information, where the prompt information is used to notify a skilled person that the program upgrade for the intelligent ECU fails.

Formats of the first diagnostic instruction, the positive response, and the negative response all comply with definitions of related instructions in the UDS protocol. The first diagnostic instruction carries a diagnostic service identifier (SID). The intelligent ECU can determine, based on the SID carried in the first diagnostic instruction, an operation type corresponding to the diagnostic instruction. Further, in an ECU upgrade procedure defined in the UDS protocol, interaction between the diagnostic device and the ECU is in a form of a diagnostic instruction, and each diagnostic instruction carries a SID. The UDS protocol defines correspondences between different SIDS and different types of operations. In an example, the SID carried in the first diagnostic instruction may be 0x10. In another example, if a SID carried in a diagnostic instruction sent by the diagnostic device to the intelligent ECU is 0x34, the diagnostic instruction indicates that the diagnostic device sends a data transmission start request to the intelligent ECU. In another example, if a SID carried in a diagnostic instruction sent by the diagnostic device to the intelligent ECU is 0x36, the diagnostic instruction indicates that the diagnostic device sends data that needs to be stored to the intelligent ECU. It should be understood that the examples herein are merely for ease of understanding of this solution, and all SIDS are not exhaustive. In addition, under constraint of the UDS protocol, different vehicle manufacturers may have slightly different definitions of the correspondence between a SID and an operation type, and a meaning of each SID depends on an actual application scenario.

If a reply of the intelligent ECU to the first diagnostic instruction is the positive response, a SID of the positive response may be specifically represented as SID+0x40 carried in the first diagnostic instruction. If a reply of the intelligent ECU to the first diagnostic instruction is the negative response, a SID of the negative response may be 0x7F, and the negative response may further include the SID of the first diagnostic instruction.

The programming session, an extended diagnostic session, and a default session are three different session modes of the intelligent ECU. A sub-service code of the programming session is 02. The intelligent ECU can be upgraded only in the programming session.

302: The diagnostic device sends a second diagnostic instruction to the intelligent ECU, where the second diagnostic instruction instructs the intelligent ECU to perform a security access operation.

In this embodiment of this application, after determining that the intelligent ECU enters the programming session, the diagnostic device sends the second diagnostic instruction to the intelligent ECU. The second diagnostic instruction instructs the intelligent ECU to perform the security access operation. Further, a name of the second diagnostic instruction in the UDS protocol may be a security access instruction, and a SID carried in the second diagnostic instruction may be 0x27.

Specifically, the second diagnostic instruction may be specifically used to request to obtain a seed. In response to the received second diagnostic instruction, the intelligent ECU may randomly generate a seed, and send the seed to the diagnostic device. The diagnostic device performs calculation on the received seed based on a preconfigured first algorithm, to obtain a first key. The diagnostic device sends the first key to the intelligent ECU. The intelligent ECU obtains a second key through calculation, and compares the first key obtained from the diagnostic device with the second key. If the first key is consistent with the second key, it is determined that the diagnostic device succeeds in authentication of security access, and the intelligent ECU sends the positive response to the diagnostic device. If the first key is inconsistent with the second key, it is determined that the diagnostic device does not succeed in authentication of security access, and the intelligent ECU sends the negative response to the diagnostic device. The second key is obtained after the intelligent ECU performs calculation on the seed based on a second algorithm.

If the diagnostic device receives the positive response and it is determined that the diagnostic device succeeds in the authentication of the security access of the intelligent ECU, step 303 is performed. If the diagnostic device receives the negative response and it is determined that the diagnostic device does not succeed in the authentication of the security access of the intelligent ECU, the upgrade procedure of the intelligent ECU is terminated. Optionally, the diagnostic device may output prompt information to notify the skilled person that the diagnostic device does not succeed in the authentication of the security access of the intelligent ECU. It should be noted that step 301 shows a rule of generating the positive response and the negative response, positive responses corresponding to diagnostic instructions of different types have different content, and negative responses corresponding to diagnostic instructions of different types have different content. Specifically, specific content of the positive response/negative response sent by the intelligent ECU to the diagnostic device should be determined with reference to an actual situation. This is not limited in this embodiment of this application. In addition, if the diagnostic device is a secure diagnostic device, the first algorithm configured in the diagnostic device and the second algorithm are a same algorithm, so that the first key obtained by the diagnostic device through calculation is consistent with the second key.

303: The intelligent ECU receives a diagnostic device fingerprint sent by the diagnostic device.

In this embodiment of this application, after determining that the diagnostic device succeeds in the authentication of the security access of the intelligent ECU, the diagnostic device sends the diagnostic device fingerprint to the intelligent ECU. Correspondingly, after receiving the diagnostic device fingerprint sent by the diagnostic device, the intelligent ECU writes the diagnostic device fingerprint into a memory of a vehicle. The diagnostic device fingerprint may be specifically represented as a character string, and the diagnostic device fingerprint carries identification information of the diagnostic device. The identification information is used to uniquely identify a diagnostic device.

Optionally, the diagnostic device fingerprint further carries corresponding time of storing the identification information of the diagnostic device, and the time may be time of generating the diagnostic device fingerprint, time of sending the diagnostic device fingerprint, or another time, which is not limited herein.

If the intelligent ECU successfully writes the diagnostic device fingerprint into the memory of the vehicle, the intelligent ECU sends a positive response to the diagnostic device. After receiving the positive response, the diagnostic device learns that the intelligent ECU has successfully stored the diagnostic device fingerprint locally, and then step 304 is performed. If the intelligent ECU fails to write the diagnostic device fingerprint into the memory of the vehicle, the intelligent ECU sends a negative response to the diagnostic device. After receiving the negative response, the diagnostic device learns that the intelligent ECU fails to locally store the diagnostic device fingerprint. In this case, the upgrade procedure of the intelligent ECU is terminated. Optionally, the diagnostic device may output prompt information to notify the skilled person that the diagnostic device fails to store the diagnostic device fingerprint locally.

304: The intelligent ECU receives a second data transmission request sent by the diagnostic device, where the second data transmission request is used to request the ECU to receive a flash drive program, and the second data transmission request carries a second memory address.

In this embodiment of this application, after determining that the intelligent ECU stores the diagnostic device fingerprint locally, the diagnostic device sends the second data transmission request to the intelligent ECU. Correspondingly, the intelligent ECU receives the second data transmission request sent by the diagnostic device.

The second data transmission request is used to request the intelligent ECU to receive the flash drive program, and the second data transmission request carries a file size of the flash drive program and the second memory address corresponding to the flash drive program. Further, a name of the second data transmission request in the UDS protocol may be a request download instruction, and a SID of the second data transmission request may be 0x34.

The intelligent ECU is integrated into the vehicle, and the second memory address is a memory address. Further, because there are a large quantity of storage units in the memory of the vehicle, to locate each storage unit, a memory address needs to be assigned to each storage unit, and the memory address indicates a number of a storage unit in the memory.

The second data request further carries a size of to-be-transmitted data (that is, the flash drive program). For example, the second data request carries "the size of the to-be-transmitted data is 10240 bytes". It should be understood that the example herein is not used to limit this solution.

305: The intelligent ECU obtains a second file path corresponding to the second memory address.

In this embodiment of this application, the intelligent ECU may pre-store a target mapping relationship, and the target mapping relationship indicates a one-to-one correspondence between at least one memory address and at least one file path. For example, the second memory address is 0x12345678, and the second file path corresponding to the second memory address is /home/upgrade/upgrade file.zip. It should be understood that the example of the memory address and the example of the file path herein are merely for ease of understanding, and are not intended to limit this solution.

Further, the target mapping relationship may be preconfigured in the vehicle when the intelligent ECU is delivered from a factory, or the target mapping relationship may be updated in the upgrade process of the intelligent ECU.

After obtaining the second memory address, the intelligent ECU may obtain, based on the correspondence between a memory address and a file path, the second file path corresponding to the second memory address, and create a second file based on an indication of the second file path, and the second file stores the flash drive program sent by the diagnostic device. After successfully creating the second file, the intelligent ECU sends a positive response to the diagnostic device, and the positive response instructs the diagnostic device to start to send the flash drive program to the intelligent ECU.

It should be noted that a file format of the second file created in this embodiment of this application may be a file format that carries address information, such as s19 or hex, or may be a file format that does not carry address information, that is, the file format may be zip, tar.gz, or another file format that does not carry address information. This is not limited in this embodiment of this application.

In addition, before the upgrade file is used to upgrade the intelligent ECU, first storage space (which will be described in a subsequent step 307) stores an upgrade file used for a previous upgrade. In the UDS protocol, the diagnostic device sends the flash drive program to the intelligent ECU, to erase the upgrade file used for the previous upgrade, so as to place the upgrade file in the first storage space.

However, in a process of storing the upgrade file into a first file to which a first file path points, the intelligent ECU may not perform a deletion operation on the upgrade file of the intelligent ECU before upgrade, and the new file may directly overwrite the old file. Therefore, step 305 is an optional step. If the intelligent ECU does not perform step 305, after receiving the second data transmission request by performing step 304, the intelligent ECU may directly send the positive response to the diagnostic device. The first file is an empty file newly created by the intelligent ECU, and that the intelligent ECU stores the upgrade file into the first file means that the intelligent ECU places a plurality of files included in the upgrade file into the first file. To more intuitively understanding this concept, the first file may be similar to a container, and the plurality of files included in the upgrade file are placed into the container (the first file).

306: The diagnostic device sends the flash drive program to the intelligent ECU.

In this embodiment of this application, after receiving the positive response for the second data transmission request, the diagnostic device starts to send the flash drive program to the intelligent ECU. The diagnostic device may send the entire flash drive program to the intelligent ECU in a manner of sending one or more second data transmission instructions to the intelligent ECU. A name of the second data transmission instruction in the UDS protocol may be a request download (transfer data) instruction, and a SID carried in the second data transmission instruction may be 0x36.

Specifically, in an implementation, if the intelligent ECU performs step 305, in step 306, the intelligent ECU receives the flash drive program sent by the diagnostic device, and stores the flash drive program into the second file to which the second file path points. Further, the diagnostic device sends the second data transmission instruction to the intelligent ECU, and the second data transmission instruction carries a part/all of data in the flash drive program. If a size of the flash drive program exceeds an upper limit of an amount of data that can be carried in one data transmission instruction, one second data transmission instruction carries a part of data in the flash drive program. If a size of the flash drive program does not exceed an upper limit of an amount of data that can be carried in one data transmission instruction, one second data transmission instruction carries all of data in the flash drive program.

The intelligent ECU stores the data in the received second data transmission instruction into the second file, and sends a positive response to the diagnostic device. After receiving the positive response, the diagnostic device determines whether transmission of the flash drive program is completed. If the transmission of the flash drive program is not completed, the diagnostic device continues to send a next second data transmission instruction to the intelligent ECU, that is, repeats a transmission process of one or more files. If the transmission of the flash drive program is completed, the diagnostic device sends a download exit request to the intelligent ECU, a name of the download exit request in the UDS protocol may be a request transfer exit instruction, and a SID carried in the download exit request may be 0x37. In response to the received download exit request, the intelligent ECU sends a positive response corresponding to the download exit request to the diagnostic device, and after receiving the positive response corresponding to the download exit request, the diagnostic device determines that a transmission operation of the flash drive program is completed.

Figure 4:
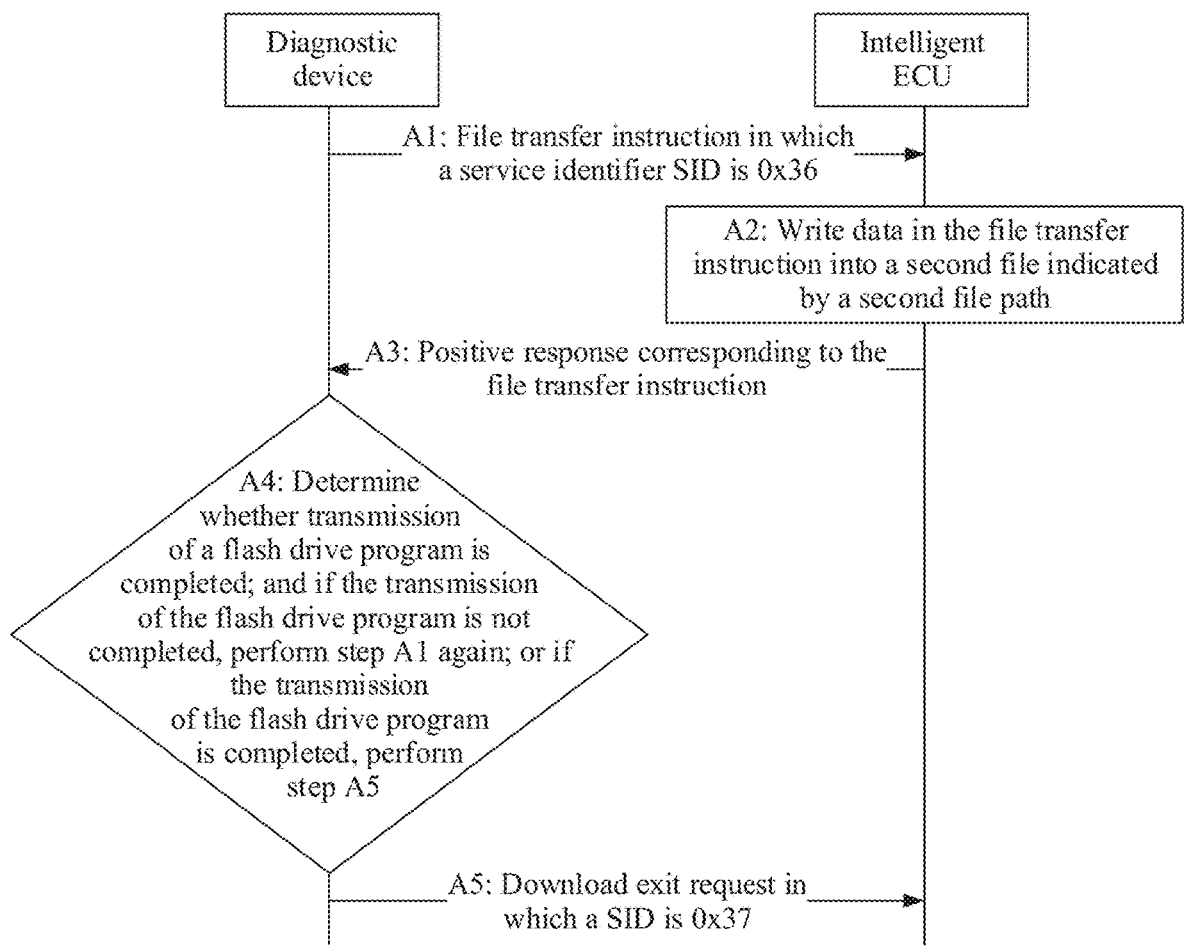
FIG. 4 is a schematic flowchart in which a diagnostic device sends a flash drive program to an intelligent ECU in a data transmission method according to an embodiment of this application.

For understanding this solution more intuitively, refer to FIG. 4. FIG. 4 is a schematic flowchart in which a diagnostic device sends a flash drive program to an intelligent ECU in a data transmission method according to an embodiment of this application. A1: The diagnostic device sends a file transfer instruction to the intelligent ECU, and a SID carried in the file transfer instruction is 0x36. A2: After receiving the file transfer instruction, the intelligent ECU writes data carried in the file transfer instruction into the second file indicated by the second file path. A3: The intelligent ECU sends a positive response corresponding to the file transfer instruction to the diagnostic device, and a SID carried in the positive response is 0x76. A4: After receiving the positive instruction corresponding to the file transfer instruction, the diagnostic device determines whether the transmission of the flash drive program is completed; and if the transmission of the flash drive program is not completed, step A1 is performed again, so that a next file transfer instruction is sent to the intelligent ECU; or if the transmission of the flash drive program is completed, step A5 is performed. A5: The diagnostic device sends the download exit request to the intelligent ECU, and the SID carried in the download exit request is 0x37. A6: The intelligent ECU sends the positive response corresponding to the download exit request to the diagnostic device, and a SID carried in the positive response is 0x77. After receiving the positive response corresponding to the download exit request, the diagnostic device determines that the transmission operation of the flash drive program is completed. It should be understood that an example in FIG. 4 is only for ease of understanding of this solution, and is not intended to limit this solution.

In this embodiment of this application, in the programming step, after receiving a transmission request of the flash drive program, the intelligent ECU can obtain the second file path corresponding to the second memory address, and store the flash drive program into the second file to which the second file path points. That is, under constraint of the UDS protocol, the intelligent ECU can also store the flash drive program in the memory, to ensure that a processing manner of the intelligent ECU meets a requirement of the UDS protocol, so as to reduce termination in the upgrade process of the intelligent ECU. This helps improve a success rate of upgrading the intelligent ECU by using the diagnostic device.

In another implementation, if the intelligent ECU does not perform step 305, step 306 includes: The intelligent ECU receives the second data transmission instruction sent by the diagnostic device, and in response to the received second data transmission instruction, directly sends the positive response corresponding to the second data transmission instruction to the diagnostic device. After receiving the positive response corresponding to the second data transmission instruction, the diagnostic device determines whether transmission of the flash drive program is completed. If the transmission of the flash drive program is not completed, the diagnostic device continues to send a next second data transmission instruction to the intelligent ECU. If the transmission of the flash drive program is completed, the diagnostic device sends a download exit request to the intelligent ECU. In response to the received download exit request, the intelligent ECU sends a positive response corresponding to the download exit request to the diagnostic device, and after receiving the positive response corresponding to the download exit request, the diagnostic device determines that a transmission operation of the flash drive program is completed.

Figure 5:
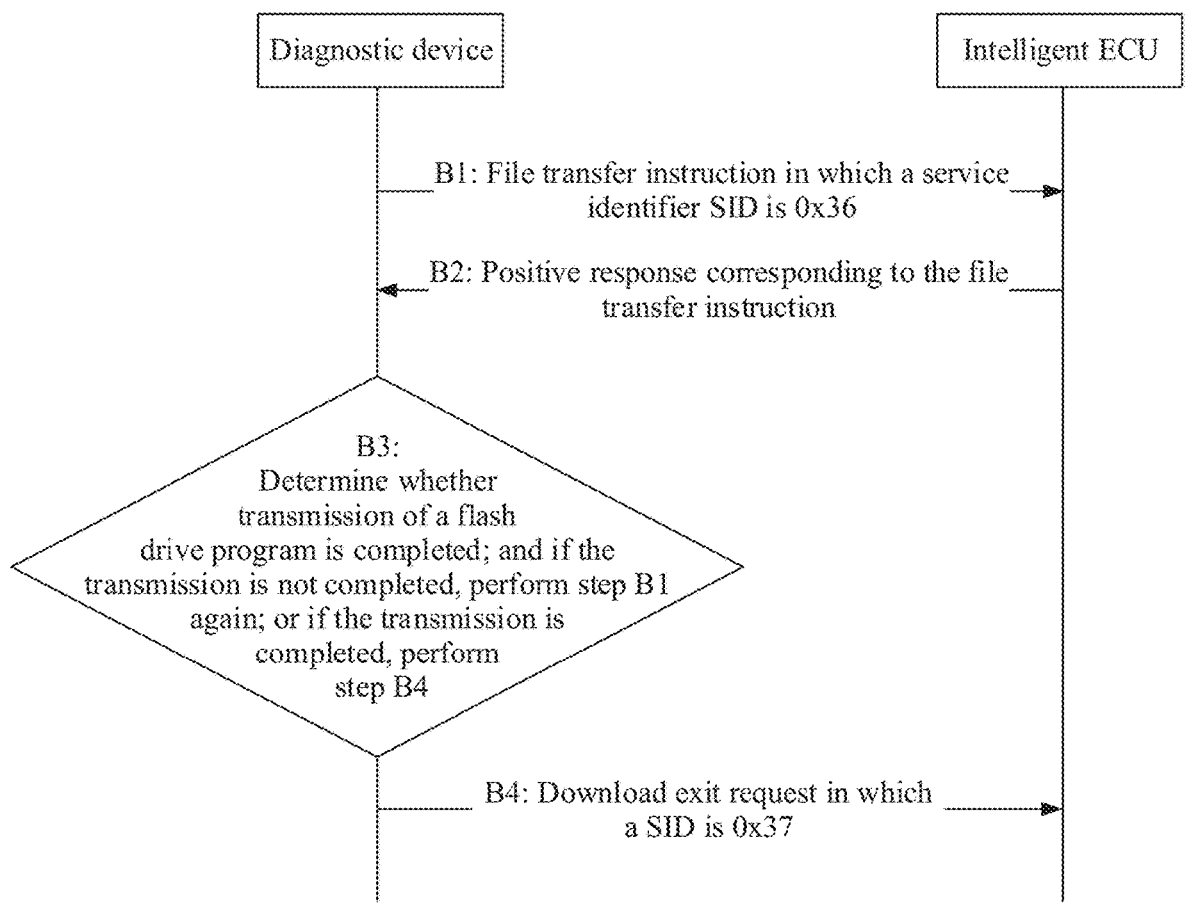
FIG. 5 is another schematic flowchart in which a diagnostic device sends a flash drive program to an intelligent ECU in a data transmission method according to an embodiment of this application.

For understanding this solution more intuitively, refer to FIG. 5. FIG. 5 is a schematic flowchart in which a diagnostic device sends a flash drive program to an intelligent ECU in a data transmission method according to an embodiment of this application. B1: The diagnostic device sends a file transfer instruction to the intelligent ECU, and a SID carried in the file transfer instruction is 0x36. B2: After receiving the file transfer instruction, the intelligent ECU directly sends a positive response corresponding to the file transfer instruction to the diagnostic device, and a SID carried in the positive response is 0x76. B3: After receiving the positive instruction corresponding to the file transfer instruction, the diagnostic device determines whether the transmission of the flash drive program is completed; and if the transmission of the flash drive program is not completed, step B1 is performed again, so that a next file transfer instruction is sent to the intelligent ECU; or if the transmission of the flash drive program is completed, step B4 is performed. B4: The diagnostic device sends the download exit request to the intelligent ECU, and the SID carried in the download exit request is 0x37. B5: The intelligent ECU sends the positive response corresponding to the download exit request to the diagnostic device, and a SID carried in the positive response is 0x77. After receiving the positive response corresponding to the download exit request, the diagnostic device determines that the transmission operation of the flash drive program is completed. It should be understood that an example in FIG. 5 is only for ease of understanding of this solution, and is not intended to limit this solution.

In this embodiment of this application, when the intelligent ECU creates a new file, an old file can be directly overwritten, that is, the intelligent ECU does not need to store the flash drive program and perform an erase operation by invoking the flash drive program, that is, the intelligent ECU does not store the flash drive program. This helps improve utilization of storage space of the intelligent ECU, and avoids a step of mapping the second memory address to the second file path and a step of storing the flash drive program, to help improve efficiency of an entire upgrade process of the intelligent ECU.

After determining that the intelligent ECU completes an operation of downloading the flash drive program, the diagnostic device sends the integrity check instruction to the intelligent ECU, and the integrity check instruction carries a first check code. In response to the received integrity check instruction, the intelligent ECU calculates a second check code based on a preconfigured target check algorithm and the downloaded flash drive program. The intelligent ECU compares the first check code with the second check code, to determine whether the first check code is consistent with the second check code. If the first check code is consistent with the second check code, the intelligent ECU determines that data of the downloaded flash drive program is complete, and sends a positive response to the diagnostic device, and the positive response indicates that the data of the flash drive program downloaded by the intelligent ECU is complete, to trigger performing step 307. If the first check code is inconsistent with the second check code, the intelligent ECU sends a negative response to the diagnostic device, and the negative response indicates that the data of the flash drive program downloaded by the intelligent ECU is incomplete, to trigger the diagnostic device to terminate the upgrade procedure of the intelligent ECU. The target check algorithm includes but is not limited to a cyclic redundancy check (CRC) algorithm, an exclusive OR check algorithm, a message-digest algorithm 5 (MD5) check algorithm, another check algorithm, or the like. This is not limited herein.

307: The intelligent ECU receives a third diagnostic instruction sent by the diagnostic device, and the third diagnostic instruction instructs the intelligent ECU to perform the erase operation on data in the first storage space.

In this embodiment of this application, after determining that the intelligent ECU obtains the complete flash drive program, the diagnostic device may send the third diagnostic instruction to the intelligent ECU, and the third diagnostic instruction instructs the intelligent ECU to perform the erase operation on the data in the first storage space. The first storage space is a storage location of an upgrade file that the diagnostic device wants to send to the intelligent ECU, and the third diagnostic instruction carries a first memory address and a size of space that the diagnostic device needs the intelligent ECU to erase, that is, a start point of the first storage space is the first memory address, and a size of the first storage space is the size of the space that the diagnostic device needs the intelligent ECU to erase (that is, a size of the upgrade file of the intelligent ECU). Further, a name of the third diagnostic instruction in the UDS protocol may be an erase memory instruction.

Specifically, in an implementation, in step 307, in response to the received third diagnostic instruction, the intelligent ECU obtains, based on the target mapping relationship, the first file path corresponding to the first memory address, and performs a deletion operation on a third file to which the first file path points. It should be noted that the third file and the first file are different files, the third file is a file created by the intelligent ECU in the previous upgrade process, and when the deletion operation is performed on the third file, the intelligent ECU has not created the first file. After the third file to which the first file path points is successfully deleted, a positive response corresponding to the third diagnostic instruction is sent to the diagnostic device. If the third file to which the first file path points fails to be deleted, a negative response corresponding to the third diagnostic instruction is sent to the diagnostic device, and the negative response corresponding to the third diagnostic instruction indicates that the intelligent ECU fails to erase the data in the first storage space. The diagnostic device terminates the program upgrade for the intelligent ECU in response to the received negative response corresponding to the third diagnostic instruction. In this embodiment of this application, the data at the storage address of the upgrade file is erased clearly and the file at the storage address of the upgrade file is deleted clearly. That is, when the intelligent ECU performs a storage operation on a received upgrade file in a subsequent step, data is stored in a blank location. In this solution, a deletion operation on the file is performed first, and the storage operation on the file is performed after a period of time. In comparison with directly using the new upgrade file to overwrite the old file, this helps reduce a probability of an error in a data storage process.

In another implementation, in step 307, the intelligent ECU sends, in response to the received third diagnostic instruction, a positive response corresponding to the third diagnostic instruction to the diagnostic device, and the positive response corresponding to the third diagnostic instruction indicates that the erase operation on the data in the first storage space is completed by the intelligent ECU.

308: The intelligent ECU receives a first data transmission request sent by the diagnostic device, where the first data transmission request is used to request the intelligent ECU to receive the upgrade file, and the first data transmission request carries the first memory address.

In this embodiment of this application, after receiving the positive response corresponding to the third diagnostic instruction that is sent by the intelligent ECU, the diagnostic device sends the first data transmission request to the intelligent ECU. The first data transmission request is used to request the intelligent ECU to receive the upgrade file, and the first data transmission request carries the first memory address corresponding to the upgrade file.

Further, because the first data transmission request and the second data transmission request are determining instructions of a same type, a SID carried in the first data transmission request may be the same as a SID carried in the second data transmission request. A concept of the first memory address is similar to a concept of the second memory address, and the first memory address and the second memory address each are a memory address. For detailed descriptions, refer to descriptions in the foregoing steps, and details are not described herein again.

309: The intelligent ECU obtains the first file path corresponding to the first memory address.

In this embodiment of this application, the intelligent ECU may pre-store the target mapping relationship. For a meaning of the target mapping relationship, refer to descriptions in step 305. In response to the received first data transmission request, the intelligent ECU obtains, based on the target mapping relationship (that is, a correspondence between a memory address and a file path), the first file path corresponding to the first memory address, and creates the first file based on the first file path, and the first file is used to store the upgrade file sent by the diagnostic device. After successfully creating the first file, the intelligent ECU sends a positive response corresponding to the first data transmission request to the diagnostic device, and the positive response corresponding to the first data transmission request indicates the diagnostic device to start to send the upgrade file to the intelligent ECU. It should be noted that, similar to the second file, a file format of the first file created in this embodiment of this application may be a file format that does not carry address information, that is, the file format may be zip or tar.gz, or may be a file format that carries address information, such as s19 or hex.

If the intelligent ECU fails to create the first file, the intelligent ECU sends a negative response corresponding to the first data transmission request to the diagnostic device, and the negative response corresponding to the first data transmission request indicates the intelligent ECU to refuse to download the upgrade file. Further, for example, a file path corresponding to the first memory address does not exist in the target mapping relationship, or for another example, the intelligent ECU fails to create the first file in a process of creating the first file. Consequently, the intelligent ECU cannot successfully create the first file. After receiving the negative response corresponding to the first data transmission request, the diagnostic device terminates the program upgrade for the intelligent ECU.

Optionally, the diagnostic device outputs prompt information to notify the skilled person that the program upgrade for the intelligent ECU is terminated because the intelligent ECU refuses to download the upgrade file.

In this implementation, the intelligent ECU pre-stores the target mapping relationship, and the target mapping relationship indicates the one-to-one correspondence between the at least one memory address and the at least one file path, so that the intelligent ECU can quickly obtain, based on the pre-stored target mapping relationship, the first file path corresponding to the first memory address. This helps increase a speed of obtaining the first file path.

310: The intelligent ECU receives the upgrade file sent by the diagnostic device, and stores the upgrade file into the first file to which the first file path points.

In this embodiment of this application, after receiving the positive response corresponding to the first data transmission request, the diagnostic device starts to send the upgrade file to the intelligent ECU. The diagnostic device may send the entire upgrade file to the intelligent ECU in a manner of sending one or more first data transmission instructions to the intelligent ECU. The intelligent ECU receives the upgrade file sent by the diagnostic device, and stores the upgrade file into the first file to which the first file path points.

Specifically, similar to the implementation of step 306, the diagnostic device sends the first data transmission instruction to the intelligent ECU, and the first data transmission instruction carries a part/all of data of the upgrade file. The intelligent ECU stores file content carried in the first data transmission instruction into the first file, and sends a positive response to the diagnostic device. After receiving the positive response, the diagnostic device determines whether transmission of the upgrade file is completed. If the transmission of the upgrade file is not completed, the diagnostic device continues to send a next first data transmission instruction to the intelligent ECU, that is, repeats a transmission process of the part of the data of the upgrade file. If the transmission of the upgrade file is completed, the diagnostic device sends a download exit request to the intelligent ECU. In response to the received download exit request, the intelligent ECU sends a positive response corresponding to the download exit request to the diagnostic device, and after receiving the positive response corresponding to the download exit request, the diagnostic device determines that a transmission operation of the upgrade file is completed.

For further descriptions, refer to descriptions in step 306. A difference lies in that in step 306, the diagnostic device sends the flash drive program to the intelligent ECU, and stores the flash drive program into the second file, while in step 310, the diagnostic device sends the upgrade file to the intelligent ECU, and stores the upgrade file into the first file.

Same as step 306, after completing an operation of downloading the upgrade file, the intelligent ECU also needs to check integrity of the upgrade file. Specifically, after determining that the intelligent ECU completes the operation of downloading the upgrade file, the diagnostic device sends the integrity check instruction to the intelligent ECU, and the integrity check instruction carries a third check code. In response to the received integrity check instruction, the intelligent ECU calculates a fourth check code based on a preconfigured target check algorithm and the downloaded upgrade file. The intelligent ECU compares the third check code with the fourth check code, to determine whether the third check code is consistent with the fourth check code. If the third check code is consistent with the fourth check code, the intelligent ECU determines that data of the downloaded upgrade file is complete, and sends a positive response to the diagnostic device, and the positive response indicates that the data of the upgrade file downloaded by the intelligent ECU is complete, to trigger performing step 311. If the third check code is inconsistent with the fourth check code, the intelligent ECU sends a negative response to the diagnostic device, and the negative response indicates that the data of the upgrade file downloaded by the intelligent ECU is incomplete, to trigger the diagnostic device to terminate the upgrade procedure of the intelligent ECU.

311: The intelligent ECU receives a fourth diagnostic instruction sent by the diagnostic device, and the fourth diagnostic instruction instructs the intelligent ECU to perform a programming dependency check operation.

In this embodiment of this application, after determining that the intelligent ECU has downloaded the complete upgrade file, the diagnostic device sends the fourth diagnostic instruction to the diagnostic device, to instruct the intelligent ECU to perform the programming dependency check operation. The programming dependency check operation aims to check validity and compatibility of the downloaded upgrade file. In the UDS protocol, the programming dependency is translated into validate application in English, and a meaning of the programming dependency may be understood with reference to the UDS protocol. For example, the programming dependency check operation includes but is not limited to an operation checking whether the downloaded upgrade file is compatible with this intelligent ECU hardware, an operation whether a digital signature of the upgrade file downloaded by the intelligent ECU is correct, or another operation. It should be noted that specific content to be checked in a specific programming dependency check operation may be defined by a manufacturer of the intelligent ECU with reference to an actual situation, and is not limited herein.

When completing the programming dependency check operation and determining that current software and hardware environments of the intelligent ECU are normal, the intelligent ECU sends a positive response corresponding to the fourth diagnostic instruction to the diagnostic device, and after receiving the positive response corresponding to the fourth diagnostic instruction, the diagnostic device triggers performing a step of a post-programming step (a specific step is described in a subsequent embodiment). When the intelligent ECU fails to complete the programming dependency check operation, the intelligent ECU sends a negative response corresponding to the fourth diagnostic instruction to the diagnostic device, and after receiving the negative response corresponding to the fourth diagnostic instruction, the diagnostic device terminates the program upgrade for the intelligent ECU.

After successfully performing the programming dependency check operation, the intelligent ECU further updates a target record, the target record records whether the programming dependency check operation is performed by the intelligent ECU, and an updated target record indicates that the programming dependency check operation is performed by the intelligent ECU. The target record may be specifically represented as a flag bit that is in the intelligent ECU and that records whether the programming dependency check is performed. When a value of the flag bit is a first value, it indicates that the programming dependency check operation is performed by the intelligent ECU; or when a value of the flag bit is a second value, it indicates that the programming dependency check operation is not performed by the intelligent ECU, where the first value and the second value are different values. For example, the first value may be true, and the second value may be false. For another example, the first value may be 1, and the second value may be 0. The first value and the second value are not exhaustive herein. It should be noted that the target record may be alternatively represented in another form, and this is not limited herein.

In this implementation, after receiving the memory address sent by the diagnostic device, the intelligent ECU first obtains the file path corresponding to the memory address, and then stores the upgrade file received from the diagnostic device on the file path. Because the intelligent ECU can determine the storage location based on the file path, the intelligent ECU can store the upgrade file sent by the diagnostic device into the file indicated by the file path, to complete an operation of storing the upgrade file. Further, the control device can obtain the upgrade file through the diagnostic device under constraint of the UDS protocol.

According to the UDS protocol, the process of upgrading the intelligent ECU includes the programming step, the post-programming step, and the pre-programming step. Because steps of the post-programming step are also improved in this embodiment of this application, the following first describes specific execution steps of the post-programming step.

2. Post-Programming Step

Figure 6:
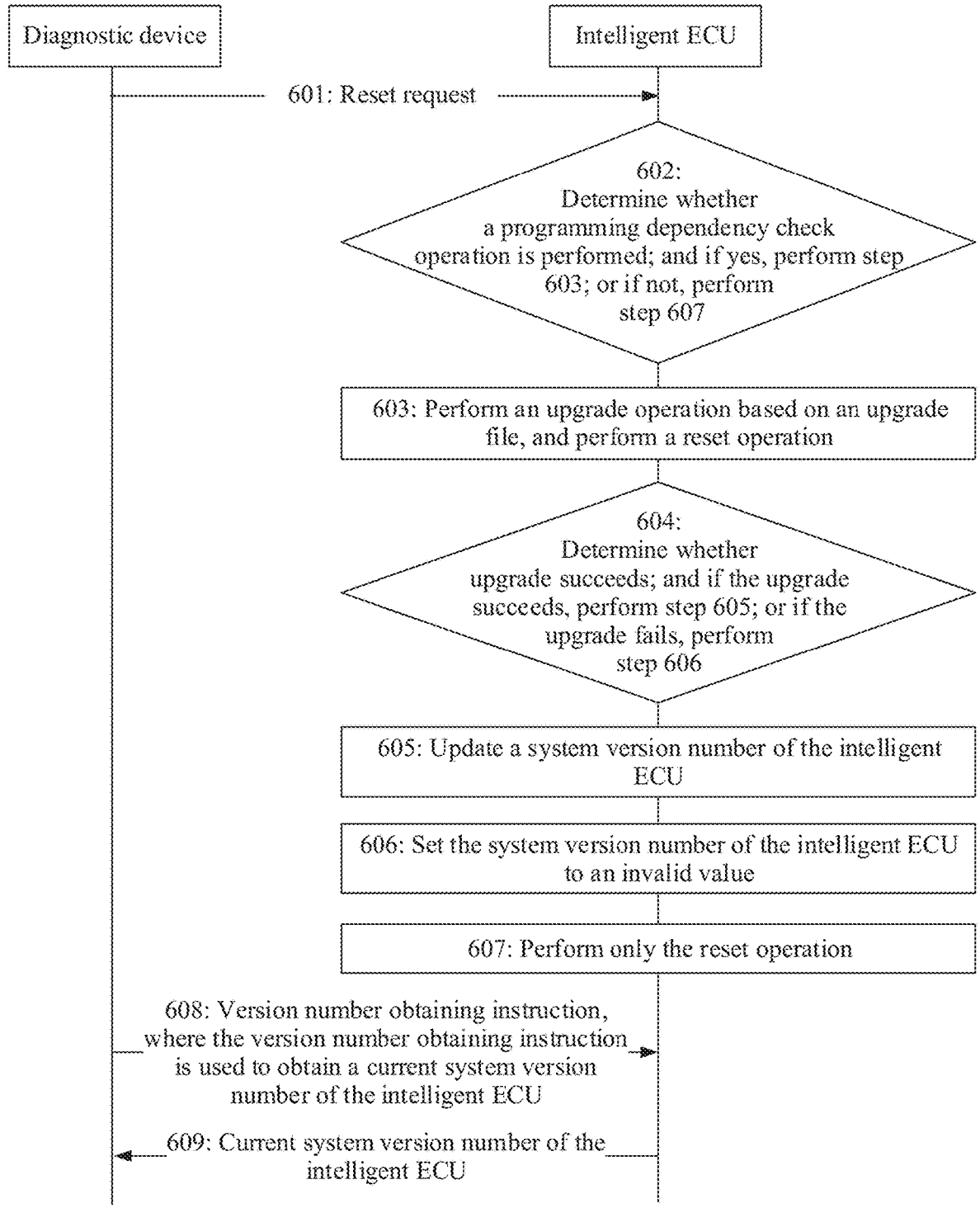
FIG. 6 is still another schematic flowchart of a data processing method according to an embodiment of this application.

In this embodiment of this application, refer to FIG. 6. FIG. 6 is a schematic flowchart of a data processing method according to an embodiment of this application. The data processing method provided in this embodiment of this application may include the following steps.

601: A diagnostic device sends a reset request to an intelligent ECU.

In this embodiment of this application, after determining that the intelligent ECU has downloaded a complete upgrade file, the diagnostic device sends the reset request to the intelligent ECU. The reset request may specifically indicate the intelligent ECU to perform hard reset, that is, indicate the intelligent ECU to perform a restart operation. Further, a name of the reset request in the UDS protocol may be an ECU reset instruction, and a SID of the reset request may be 0x11.

In response to the received reset request, the intelligent ECU sends a positive response corresponding to the reset request to the diagnostic device. If the intelligent ECU is in a programming session at this time, the intelligent ECU triggers performing step 602. It should be noted that the diagnostic device may also send the reset request to the intelligent ECU without being in an upgrade program of the intelligent ECU, and step 602 is performed only when the intelligent ECU is in the programming session. Otherwise, the intelligent ECU directly performs the reset operation.

> 602: The intelligent ECU determines whether a programming dependency check operation is performed; and if the programming dependency check operation is performed, performs step 603; or if the programming dependency check operation is not performed, performs step 607.

In this embodiment of this application, after sending the positive response corresponding to the reset request to the diagnostic device, the intelligent ECU reads the target record mentioned in step 311 in the embodiment corresponding to FIG. 3, to determine whether the programming dependency check operation is performed by the intelligent ECU. If it is determined, based on the target record, that the programming dependency check operation is performed by the intelligent ECU, step 603 is performed, and the target record is updated again, where the updated target record indicates that the programming dependency check operation is not performed by the intelligent ECU. For example, a value of a flag bit is changed from true to false, and for another example, a value of a flag bit is changed from 1 to 0. If it is determined that the programming dependency check operation is not performed, step 607 is performed.

> 603: The intelligent ECU performs an upgrade operation based on the upgrade file, and performs a reset operation on the intelligent ECU.

In this embodiment of this application, the intelligent ECU performs the upgrade operation on the intelligent ECU based on the upgrade file. Specifically, the intelligent ECU performs a decompression operation on the downloaded upgrade file, to obtain a plurality of upgrade sub-files, configuration information, and a system version number. The configuration information indicates an installation manner of each upgrade sub-file in the upgrade file. The intelligent ECU separately installs the plurality of upgrade sub-files in the upgrade file in corresponding manners based on indications of the configuration information, to complete the upgrade operation on the intelligent ECU and then perform the reset operation (that is, the restart operation) on the intelligent ECU.

In this embodiment of this application, in the UDS protocol, after a non-intelligent ECU completes download of the upgrade file, it is considered that the upgrade operation on the ECU is completed. However, for the intelligent ECU, only downloading the upgrade file locally cannot complete the upgrade operation on the intelligent ECU. In this embodiment of this application, it is selected that after the intelligent ECU receives the reset request, triggering of the upgrade operation is automatically completed, to ensure that the upgrade process of the intelligent ECU is fully automated.

It should be noted that step 602 and step 603 are optional steps. If step 602 and step 603 are not performed, after the intelligent ECU downloads the upgrade file locally, a skilled person may manually trigger performing the upgrade operation on the intelligent ECU based on the upgrade file.

It should be noted that, when performing the reset (namely, restart) operation, the intelligent ECU switches a session mode from the programming session to an extended diagnostic session, adjusts a communication mode of the intelligent ECU to normally receive and send packets of all types, enables a diagnostic trouble code (DTC) detection function and a DTC storage function, and switches the session mode from the extended diagnostic session to a default session.

According to the UDS protocol, in a pre-programming step, the diagnostic device sends a communication control instruction to the intelligent ECU, to adjust the communication mode of the intelligent ECU to prohibit receiving and sending a non-diagnostic packet. Therefore, after the intelligent ECU completes the upgrade operation, the communication mode of the intelligent ECU needs to be adjusted to normally receive and send all types of packets.

According to the UDS protocol, in the pre-programming step, the diagnostic device further sends a control DTC setting instruction to the intelligent ECU, to disable a DTC detection function and a DTC storage function of the intelligent ECU. Therefore, after the intelligent ECU completes the upgrade operation, the DTC detection function and the DTC storage function need to be enabled again.

> 604: The intelligent ECU determines whether the upgrade succeeds; and if the upgrade succeeds, performs step 605; or if the upgrade does not succeed, performs step 606.

In this embodiment of this application, when performing the reset operation, that is, after being restarted, the intelligent ECU reads data in the upgrade file. If the intelligent ECU can be successfully restarted, that is, no fault occurs in a restart process, it indicates that the upgrade of the intelligent ECU succeeds. If a fault occurs in the restart process of the intelligent ECU, it indicates that the upgrade of the intelligent ECU fails. For example, the fault in the restart process may be a failure in switching a storage system partition of the intelligent ECU, a failure in starting some applications in the intelligent ECU, or another type of fault, and this is not exhaustive herein. It should be noted that, if the upgrade of the intelligent ECU fails, some functions of the intelligent ECU are faulty. The foregoing fault is detected in the restart process of the intelligent ECU, and that some functions of the intelligent ECU are faulty does not cause a failure in starting the intelligent ECU.

> 605: The intelligent ECU updates a system version number of the intelligent ECU.

In this embodiment of this application, the intelligent ECU stores a current system version number of the intelligent ECU. After it is determined that the upgrade operation succeeds, the system version number carried in the upgrade file is obtained, and the system version number of the intelligent ECU is updated to the system version number (that is, a valid system version number) carried in the upgrade file. For example, the system version number may be S00001, S00002, S00003, or another version number. Examples herein are merely for ease of understanding of this solution, and are not intended to limit this solution.

606: The intelligent ECU sets the system version number of the intelligent ECU to an invalid value.

In this embodiment of this application, after determining that the upgrade operation fails, the intelligent ECU sets the system version number of the intelligent ECU to the invalid value, and the invalid value indicates that the upgrade operation fails. For example, the invalid value may be 000000, FFFFFF, or another value, and this is not exhaustive herein.

607: The intelligent ECU performs only the reset operation.

In this embodiment of this application, when the intelligent ECU is in the programming session, after receiving the reset request and determining, based on the target record, that a programming dependency check is not performed, the intelligent ECU determines that the intelligent ECU is not in the upgrade program, and performs only the reset operation.

When the intelligent ECU is in the programming session, the intelligent ECU may receive the reset request not only in the upgrade program, but also in another program. Therefore, the intelligent ECU determines whether the programming dependency check operation is performed, to determine whether the intelligent ECU is in the upgrade procedure. When it is determined that the intelligent ECU is not in the upgrade procedure, the intelligent ECU performs only the reset operation and does not perform the upgrade program, to ensure that the intelligent ECU performs the upgrade operation only by using the upgrade file during the upgrade process, and avoid incorrect triggering of the upgrade operation.

608: The diagnostic device sends a version number obtaining instruction to the intelligent ECU, and the version number obtaining instruction is used to obtain the current system version number of the intelligent ECU.

In some embodiments of this application, the diagnostic device may obtain a target instruction input by a user, and send the version number obtaining instruction to the intelligent ECU in response to the target instruction. Correspondingly, the intelligent ECU can receive the version number obtaining instruction sent by the diagnostic device.

For a process in which the diagnostic device obtains the target instruction input by the user, refer to the following descriptions. In one case, the target instruction is an obtaining instruction for the current system version number of the intelligent ECU. Specifically, in an implementation, the diagnostic device is configured with a display, and an icon used to receive the target instruction is preconfigured on the display. In this case, the user may perform a tap operation on the icon, to input the target instruction, the user may drag the icon to a preset location on the display, to input the target instruction, the user may perform a double-tap operation on the icon, to input the target instruction, or the like. In another implementation, the user may directly send the target instruction to the diagnostic device through a wired network or a wireless network. It should be understood that examples herein are merely for ease of understanding of this solution, and are not used to limit a manner of obtaining the target instruction by the diagnostic device.

In another case, the target instruction is an instruction indicating whether the intelligent ECU successfully completes the upgrade operation, that is, the target instruction is an instruction that triggers the diagnostic device to determine whether the intelligent ECU successfully completes the upgrade operation. Specifically, similar to the foregoing case, the diagnostic device may obtain the target instruction through a display, or may obtain the instruction through a wired network or a wireless network. A specific implementation is not described herein again.

Figure 7:
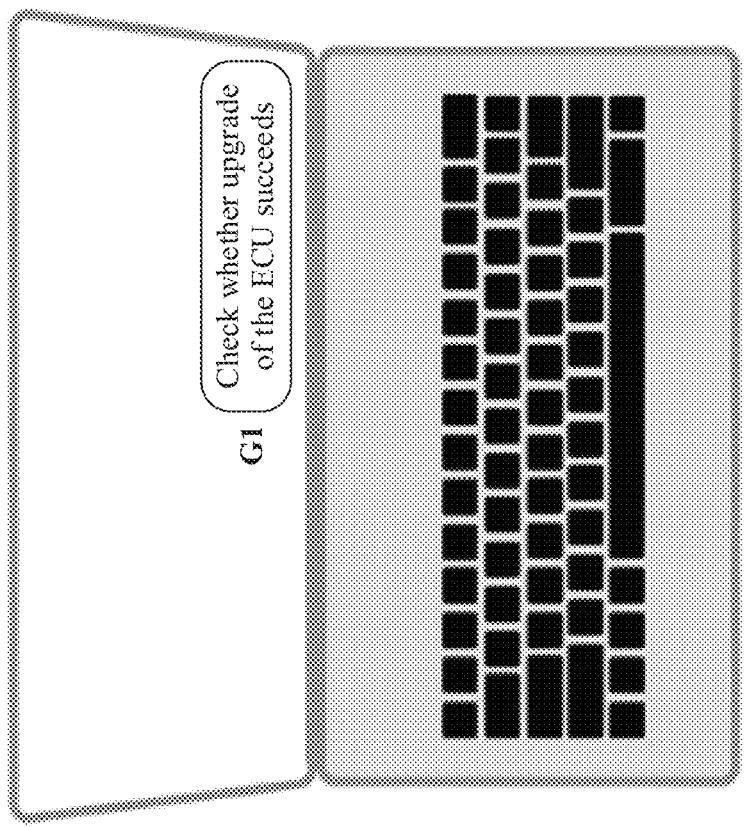
FIG. 7 is a schematic diagram of an interface of obtaining a target instruction in a data processing method according to an embodiment of this application.
Figure 7:
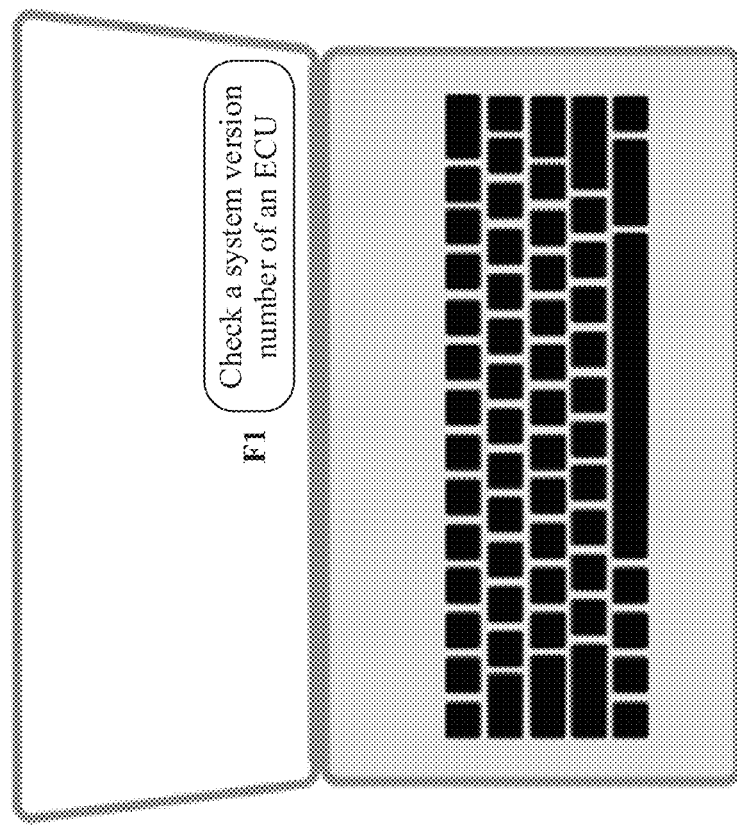

For understanding this solution more intuitively, refer to FIG. 7. FIG. 7 is a schematic diagram of an interface of obtaining a target instruction in a data processing method according to an embodiment of this application. FIG. 7 includes a left sub-diagram and a right sub-diagram. In the left schematic diagram of FIG. 7, F1 indicates an icon used to obtain the target instruction. In the left sub-diagram of FIG. 7, the target instruction is an instruction used to trigger obtaining of the current system version number of the intelligent ECU. When the diagnostic device receives a tap operation for F1, it is considered that the target instruction input by the user is obtained. In the right sub-diagram of FIG. 7, G1 indicates an icon used to obtain the target instruction. In the right sub-diagram of FIG. 7, an example in which the target instruction is an instruction used to trigger the diagnostic device to determine whether the intelligent ECU successfully completes the upgrade operation is illustrated. When the diagnostic device receives a tap operation for G1, it is considered that the target instruction input by the user is obtained. It should be understood that the example in FIG. 7 is merely for ease of understanding of this solution, and is not intended to limit this solution.

609: The diagnostic device receives the current system version number sent by the intelligent ECU.

In some embodiments of this application, the intelligent ECU sends the current system version number of the intelligent ECU to the diagnostic device in response to the received target instruction. In one case, the target instruction is the version number of the intelligent ECU. In an implementation, after receiving the current system version number of the intelligent ECU, the diagnostic device may output the system version number of the intelligent ECU through the display, so that the user may determine, based on the system version number, that the upgrade of the intelligent ECU fails. In another implementation, the diagnostic device may send the current system version number of the intelligent ECU to the user through the wired network or the wireless network.

In another case, the target instruction is an instruction indicating whether the intelligent ECU successfully completes the upgrade operation. After receiving the system version number sent by the intelligent ECU, the diagnostic device determines whether the system version number of the intelligent ECU is the invalid value; and if the system version number of the intelligent ECU is the invalid value, the intelligent ECU outputs first prompt information, where the first prompt information is used to notify the user that the upgrade of the intelligent ECU fails; or if the system version number of the intelligent ECU is not the invalid value, the intelligent ECU outputs second prompt information, where the second prompt information is used to notify the user that the upgrade of the intelligent ECU succeeds.

Further, the diagnostic device may directly output the first prompt information or the second prompt information through the display, where the first prompt information and the second prompt information may be specifically represented in a form of a text box, a voice, an icon, or the like. This is not limited herein. Alternatively, the diagnostic device may send the first prompt information or the second prompt information to the user through the wireless network or the wired network. This is not limited herein.

In this embodiment of this application, in the UDS protocol, downloading the upgrade file to the ECU is considered as completing the upgrade operation of the ECU. Therefore, the diagnostic device controls the ECU to perform the programming dependency check operation. If the programming dependency check operation is passed, the diagnostic device determines that the upgrade of the ECU succeeds; or if the programming dependency check operation is not passed, the diagnostic device determines that the upgrade of the ECU fails. In addition, in the UDS protocol, the diagnostic device determines, by determining whether the programming dependency check operation is passed, whether the upgrade of the ECU succeeds. Therefore, in a current non-intelligent ECU, according to the current UDS protocol, an upper computer does not check, based on the system version number, whether the upgrade succeeds. In this solution, after determining that the upgrade operation fails, the intelligent ECU sets the system version number of the intelligent ECU to the invalid value, so that the diagnostic device can check in time whether the upgrade of the intelligent ECU succeeds, to ensure the upgrade of the intelligent ECU really succeeds, so as to ensure the safety of a vehicle running process.

Figure 8:
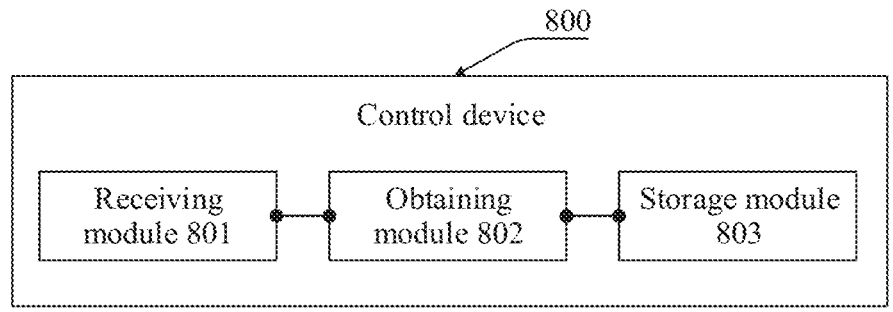
FIG. 8 is a schematic diagram of a structure of a control device according to an embodiment of this application.

Based on embodiments corresponding to FIG. 2 to FIG. 7, to better implement the foregoing solutions in embodiments of this application, the following further provides related devices configured to implement the foregoing solution. Specifically, FIG. 8 is a schematic diagram of a structure of a control device according to an embodiment of this application. A control device 800 includes: a receiving module 801, configured to receive a first data transmission request sent by a diagnostic device, where the first data transmission request is used to request the control device to receive an upgrade file, the first data transmission request carries a first memory address corresponding to the upgrade file, and the upgrade file is used to upgrade the control device; an obtaining module 802, configured to obtain a first file path corresponding to the first memory address; and a storage module 803, configured to: receive the upgrade file sent by the diagnostic device, and store the upgrade file into a first file to which the first file path points.

In a possible design, the obtaining module 802 is specifically configured to obtain, based on a correspondence between a memory address and a file path, the first file path corresponding to the first memory address.

In a possible design, the receiving module 801 is further configured to receive a second data transmission request sent by the diagnostic device, the second data transmission request is used to request the control device to receive a flash drive program, and the second data transmission request carries a second memory address corresponding to the flash drive program; the obtaining module 802 is further configured to obtain a second file path corresponding to the second memory address; and the storage module 803 is further configured to: receive the flash drive program sent by the diagnostic device, and store the flash drive program into a second file to which the second file path points.

Figure 9:
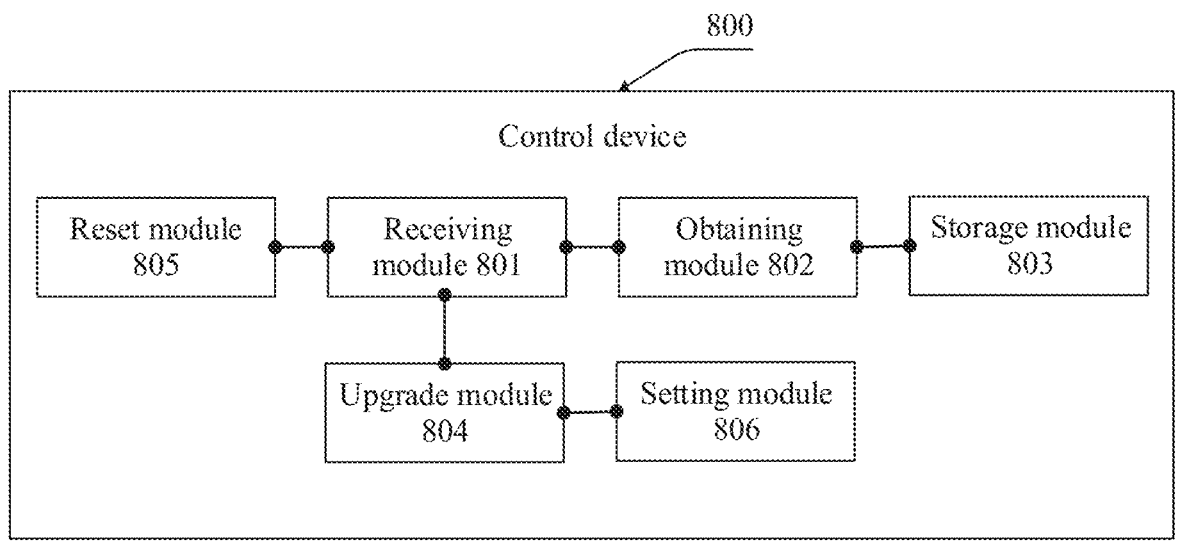
FIG. 9 is a schematic diagram of another structure of a control device according to an embodiment of this application.

In a possible design, as shown in FIG. 9, FIG. 9 is a schematic diagram of a structure of an electronic control unit control device according to an embodiment of this application. The receiving module 801 is further configured to receive, when the control device is in a programming session, a reset request sent by the diagnostic device. The control device 800 further includes: an upgrade module 804, configured to: in response to the received reset request, determine that a programming dependency check operation is performed by the control device, perform an upgrade operation based on the upgrade file, and perform a reset operation.

In a possible design, as shown in FIG. 9, the receiving module 801 is further configured to receive a reset request when the control device is in a programming session; and the control device 800 further includes: a reset module 805, configured to: in response to the received reset request, determine that a programming dependency check operation is not performed by the control device, and trigger only a reset operation.

In a possible design, as shown in FIG. 9, the control device 800 further includes a setting module 806, configured to: when it is determined that an upgrade operation fails to be performed, set a system version number of the control device to an invalid value, where the invalid value indicates that the upgrade operation fails.

It should be noted that content such as information exchange and an execution process between the modules/units in the control device 800 is based on a same concept as the method embodiments corresponding to FIG. 2 to FIG. 7 in this application. For specific content, refer to the descriptions of the steps performed by the intelligent ECU in the foregoing method embodiments in this application. Details are not described herein again.

Figure 10:
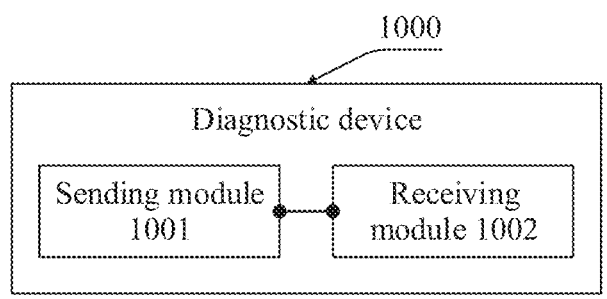
FIG. 10 is a schematic diagram of a structure of a diagnostic device according to an embodiment of this application.

An embodiment of this application further provides a diagnostic device. FIG. 10 is a schematic diagram of a structure of a diagnostic device according to an embodiment of this application. A diagnostic device 1000 includes: a sending module 1001, configured to send a first data transmission request to a control device, where the first data transmission request is used to request the control device to receive an upgrade file, the first data transmission request carries a first memory address corresponding to the upgrade file, the first memory address corresponds to a first file path, and the upgrade file is used to upgrade the control device; and a receiving module 1002, configured to receive a first positive response sent by the control device, where the sending module 1001 is further configured to send the upgrade file to the control device based on the first positive response, and the upgrade file is stored into a first file to which the first file path points.

In a possible design, the sending module 1001 is further configured to: send a reset request to the control device, where the reset request indicates the control device to trigger, when a programming dependency check operation is performed, an upgrade operation based on the upgrade file, and a reset operation.

In a possible design, the sending module 1001 is further configured to send a version number query request to the control device; and the receiving module 1002 is further configured to receive a system version number sent by the control device, where when the system version number is an invalid value, it indicates that upgrade of the control device fails.

It should be noted that content such as information exchange and an execution process between the modules/units in the diagnostic device 1000 is based on a same concept as the method embodiments corresponding to FIG. 2 to FIG. 7 in this application. For specific content, refer to the descriptions of the steps performed by the diagnostic device in the foregoing method embodiments in this application. Details are not described herein again.

Figure 11:
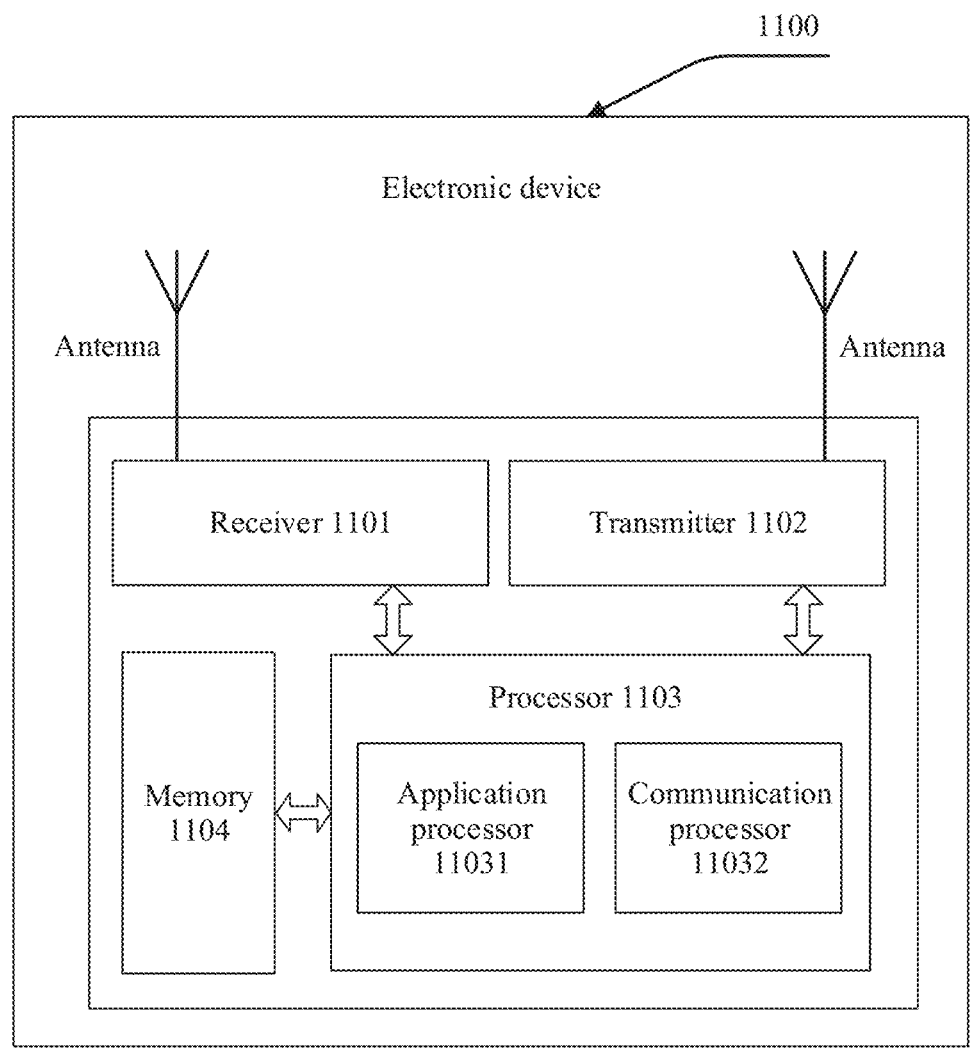
FIG. 11 is a schematic diagram of a structure of an electronic device according to an embodiment of this application.

The following describes an electronic device according to an embodiment of this application. FIG. 11 is a schematic diagram of a structure of an electronic device according to an embodiment of this application. If the control device 800 described in embodiments corresponding to FIG. 8 or FIG. 9 is deployed in an electronic device 1100, to implement functions of the intelligent ECU in embodiments corresponding to FIG. 2 to FIG. 7, the electronic device 1100 may be specifically represented as a vehicle. If the diagnostic device 1000 described in the embodiment corresponding to FIG. 10 is deployed on the electronic device 1100, to implement functions of the diagnostic device in embodiments corresponding to FIG. 2 to FIG. 7, the electronic device 1100 may be specifically represented as a terminal device such as a mobile phone, a tablet computer, a notebook computer, or a desktop computer. This is not limited herein. Specifically, the electronic device 1100 includes a receiver 1101, a transmitter 1102, a processor 1103, and a memory 1104 (the electronic device 1100 may include one or more processors 1103, and one processor is used as an example in FIG. 11). The processor 1103 may include an application processor 11031 and a communication processor 11032. In some embodiments of this application, the receiver 1101, the transmitter 1102, the processor 1103, and the memory 1104 may be connected through a bus or in another manner.

The memory 1104 may include a read-only memory and a random access memory, and provide an instruction and data to the processor 1103. A part of the memory 1104 may further include a non-volatile random access memory (NVRAM). The memory 1104 stores a processor and operation instructions, an executable module or a data structure, or a subset thereof, or an extended set thereof. The operation instructions may include various operation instructions for implementing various operations.

The processor 1103 controls an operation of the electronic device. During specific application, components of the electronic device are coupled together through a bus system. In addition to a data bus, the bus system may further include a power bus, a control bus, a status signal bus, and the like. However, for clear description, various types of buses in the figure are marked as the bus system.

The method disclosed in the foregoing embodiments of this application may be applied to the processor 1103, or implemented by the processor 1103. The processor 1103 may be an integrated circuit chip and has a signal processing capability. In an implementation process, each step of the foregoing method may be completed by using an integrated logic circuit of hardware in the processor 1103 or an instruction in a form of software. The processor 1103 may be a general-purpose processor, a digital signal processor (DSP), a microprocessor or a microcontroller, and may further include an application-specific integrated circuit (ASIC), a field-programmable gate array (FPGA) or another programmable logic device, a discrete gate or transistor logic device, or a discrete hardware component. The processor 1103 may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1104, and the processor 1103 reads information in the memory 1104 and completes the steps in the foregoing methods in combination with hardware of the processor.

The receiver 1101 may be configured to receive input digit or character information, and generate a signal input related to a related setting and function control of the electronic device. The transmitter 1102 may be configured to output digit or character information through a first interface. The transmitter 1102 may be further configured to send an instruction to a disk group through the first interface, to modify data in the disk group. The transmitter 1102 may further include a display device such as a display.

In this embodiment of this application, in one case, the processor 1103 is configured to perform the data processing method performed by the intelligent ECU in embodiments corresponding to FIG. 2 to FIG. 7. In another case, the processor 1103 is configured to perform the data processing method performed by the diagnostic device in embodiments corresponding to FIG. 2 to FIG. 7.

It should be noted that a specific manner in which the processor 1103 performs the foregoing steps is based on a same concept as the method embodiments corresponding to FIG. 2 and FIG. 7 in this application. Technical effects brought by the specific manner are the same as those in the method embodiments corresponding to FIG. 2 and FIG. 7 in this application. For specific content, refer to the descriptions in the foregoing method embodiments in this application. Details are not described herein again.

An embodiment of this application further provides a computer program product. When the computer program product is run on a computer, the computer is enabled to perform the steps performed by the intelligent ECU in the methods described in embodiments shown in FIG. 2 to FIG. 7, or the computer is enabled to perform the steps performed by the diagnostic device in the methods described in embodiments shown in FIG. 2 to FIG. 7.

An embodiment of this application further provides a computer-readable storage medium. The computer-readable storage medium stores a program used for signal processing. When the program is run on a computer, the computer is enabled to perform the steps performed by the intelligent ECU in the methods described in embodiments shown in FIG. 2 to FIG. 7, or the computer is enabled to perform the steps performed by the diagnostic device in the methods described in embodiments shown in FIG. 2 to FIG. 7.

The electronic device, the intelligent ECU, or the diagnostic device provided in embodiments of this application may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the electronic device performs the data processing method described in embodiments shown in FIG. 2 or FIG. 7. Optionally, the storage unit is a storage unit in the chip, for example, a register or a cache; or the storage unit may be a storage unit that is in a radio access device and that is located outside the chip, for example, a read-only memory (ROM), another type of static storage device that can store static information and instructions, or a random access memory (RAM).

An embodiment of this application further provides a vehicle. One or more control devices are configured in the vehicle, and the control device is configured to perform the steps performed by the intelligent ECU in the methods described in embodiments shown in FIG. 2 to FIG. 7.

An embodiment of this application further provides a data processing system. The data processing system includes a control device and a diagnostic device. The control device is configured to perform the steps performed by the intelligent ECU in the methods described in embodiments shown in FIG. 2 to FIG. 7, and the diagnostic device is configured to perform the steps performed by the diagnostic device in the methods described in embodiments shown in FIG. 2 to FIG. 7.

The processor mentioned anywhere above may be a general-purpose central processing unit, a microprocessor, an ASIC, or one or more integrated circuits that are configured to control program execution of the method in the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the foregoing embodiments may be implemented by using software, hardware, firmware, or any combination thereof. When software is used to implement embodiments, all or a part of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. An upgrade method of an intelligent electronic control unit (ECU) of a vehicle, wherein the method comprises:
   receiving, by the intelligent ECU, a first data transmission request sent by a diagnostic device based on a constraint of unified diagnostic services (UDS) protocol, wherein the first data transmission request comprises a request to the intelligent ECU to receive an upgrade file, the first data transmission request carries a first memory address corresponding to the upgrade file, and the upgrade file is used to upgrade the intelligent ECU;
   obtaining, by the intelligent ECU, a first file path corresponding to the first memory address;
   receiving, by the intelligent ECU, the upgrade file sent by the diagnostic device;
   storing the upgrade file into a first file to which the first file path points;
   receiving, by the intelligent ECU, a reset request sent by the diagnostic device; and
   determining, by the intelligent ECU in response to the received reset request, whether a programming dependency check operation is performed by the intelligent ECU; and
   based the determination of whether the programming dependency check operation is performed by the intelligent ECU, performing at least one of the following:
      performing an upgrade operation based on the upgrade file, and performing a reset operation; or
      triggering a reset operation without performing the upgrade operation.

2. The method according to claim 1, wherein the obtaining, by the intelligent ECU, the first file path corresponding to the first memory address comprises:
   obtaining, by the intelligent ECU based on a correspondence between a memory address and a file path, the first file path corresponding to the first memory address.

3. The method according to claim 1, wherein before the receiving, by the intelligent ECU, the first data transmission request sent by the diagnostic device based on the constraint of UDS protocol, the method further comprises:
   receiving, by the intelligent ECU, a second data transmission request sent by the diagnostic device, wherein the second data transmission request comprises a request to the intelligent ECU to receive a flash drive program, and the second data transmission request carries a second memory address corresponding to the flash drive program;
   obtaining, by the intelligent ECU, a second file path corresponding to the second memory address;
   receiving, by the intelligent ECU, the flash drive program sent by the diagnostic device; and
   storing the flash drive program into a second file to which the second file path points;
   wherein the second data transmission request is based on the constraint of UDS protocol.

4. The method according to claim 1, wherein
the reset request is received when the intelligent ECU is in a programming session, and the upgrade operation based on the upgrade file is performed in response to determining, by the intelligent ECU in response to the received reset request, that the programming dependency check operation is performed by the intelligent ECU.

5. The method according to claim 4, wherein after the performing, by the intelligent ECU, the upgrade operation based on the upgrade file, the method further comprises:
when it is determined that the upgrade operation fails, setting a system version number of the intelligent ECU to an invalid value, wherein the invalid value indicates that the upgrade operation fails.

6. The method according to claim 1, wherein the upgrade operation is not performed in response to determining that the intelligent ECU does not perform the programming dependency check operation.

7. An upgrade method of an intelligent electronic control unit (ECU) of a vehicle, wherein the method comprises:
sending, by a diagnostic device based on a constraint of unified diagnostic services (UDS) protocol, a first data transmission request to the intelligent ECU, wherein the first data transmission request comprises a request to the intelligent ECU to receive an upgrade file, the first data transmission request carries a first memory address corresponding to the upgrade file, the first memory address corresponds to a first file path, and the upgrade file is used to upgrade the intelligent ECU; and
receiving, by the diagnostic device, a first positive response sent by the intelligent ECU;
sending the upgrade file to the intelligent ECU based on the first positive response, wherein the upgrade file is stored into a first file to which the first file path points; and
sending, by the diagnostic device, a reset request to the intelligent ECU, wherein the reset request indicates the intelligent ECU to trigger, when a programming dependency check operation is performed, an upgrade operation based on the upgrade file, and a reset operation.

8. The method according to claim 7, wherein the method further comprises:
sending, by the diagnostic device, a version number query request to the intelligent ECU; and
receiving a system version number sent by the intelligent ECU, wherein when the system version number is an invalid value, the invalid value indicates that upgrade of the intelligent ECU fails.

9. The method according to claim 8, wherein the method further comprises: obtaining a target instruction, and wherein the version number query request is sent in response to the target instruction.

10. The method according to claim 9, wherein the target instruction is received through a user interface of the diagnostic device.

11. The method according to claim 9, wherein the target instruction indicates whether the upgrade operation is successfully completed.

12. An intelligent ECU, wherein the intelligent ECU comprises:
at least one processor; and
one or more memories coupled to the at least one processor and storing programming instructions for execution by the at least one processor to cause the intelligent ECU to:
receive a first data transmission request sent by a diagnostic device based on a constraint of unified diagnostic services (UDS) protocol, wherein the first data transmission request comprises a request to the intelligent ECU to receive an upgrade file, the first data transmission request carries a first memory address corresponding to the upgrade file, and the upgrade file is used to upgrade the intelligent ECU;
obtain a first file path corresponding to the first memory address;
receive the upgrade file sent by the diagnostic device;
store the upgrade file into a first file to which the first file path points;
receive a reset request sent by the diagnostic device; and
determine, in response to the received reset request, whether a programming dependency check operation is performed by the intelligent ECU; and
based the determination of whether the programming dependency check operation is performed by the intelligent ECU, perform at least one of the following:
perform an upgrade operation based on the upgrade file, and performing a reset operation; or
trigger a reset operation without performing the upgrade operation.

13. The intelligent ECU according to claim 12, wherein the programming instructions, when executed by the at least one processor, cause the intelligent ECU to execute the program to obtain, based on a correspondence between a memory address and a file path, the first file path corresponding to the first memory address.

14. The intelligent ECU according to claim 12, wherein the programming instructions, when executed by the at least one processor, cause the intelligent ECU to:
receive a second data transmission request sent by the diagnostic device, wherein the second data transmission request comprises a request to the intelligent ECU to receive a flash drive program, and the second data transmission request carries a second memory address corresponding to the flash drive program;
obtain a second file path corresponding to the second memory address;
receive the flash drive program sent by the diagnostic device; and
store the flash drive program into a second file to which the second file path points;
wherein the second data transmission request is based on the constraint of UDS protocol.

15. The intelligent ECU according to claim 12, wherein the reset request is received when the intelligent ECU is in a programming session, and the upgrade operation based on the upgrade file is performed in response to determining that the programming dependency check operation is performed by the intelligent ECU.

16. The intelligent ECU according to claim 15, wherein the programming instructions, when executed by the at least one processor, cause the intelligent ECU to: when it is determined that the upgrade operation fails, set a system version number of the intelligent ECU to an invalid value, wherein the invalid value indicates that the upgrade operation fails.

17. The intelligent ECU according to claim 12, wherein the upgrade operation is not performed in response to determining that the intelligent ECU does not perform the programming dependency check operation.

18. A diagnostic device, wherein the diagnostic device comprises:
at least one processor; and
one or more memories coupled to the at least one processor and storing programming instructions for execution by the at least one processor to cause the diagnostic device to:
send a first data transmission request to an intelligent electronic control unit (ECU) based on a constraint of unified diagnostic services (UDS) protocol, wherein the first data transmission request comprises a request to the intelligent ECU to receive an upgrade file, the first data transmission request carries a first memory address corresponding to the upgrade file, the first memory address corresponds to a first file path, and the upgrade file is used to upgrade the intelligent ECU;
receive a first positive response sent by the intelligent ECU;
send the upgrade file to the intelligent ECU based on the first positive response, wherein the upgrade file is stored into a first file to which the first file path points; and
send a reset request to the intelligent ECU, wherein the reset request indicates the intelligent ECU to trigger, when a programming dependency check operation is performed, an upgrade operation based on the upgrade file, and a reset operation.

19. The diagnostic device according to claim 18, wherein the programming instructions, when executed by the at least one processor, cause the diagnostic device to:
send a version number query request to the intelligent ECU; and
receive a system version number sent by the intelligent ECU, wherein when the system version number is an invalid value, the invalid value indicates that upgrade of the intelligent ECU fails.

20. The diagnostic device according to claim 19, wherein the programming instructions, when executed by the at least one processor, cause the diagnostic device to obtain a target instruction, and wherein the version number query request is sent in response to the target instruction.

* * * * *